US012636878B1

(12) United States Patent
Jia

(10) Patent No.: US 12,636,878 B1

(45) Date of Patent: May 26, 2026

(54) LIFTABLE AND ROTATABLE MULTIFUNCTIONAL THERMAL TRANSFER PRINTER

(71) Applicant: Shengzhou Dingda Machinery Co., Ltd., Shaoxing (CN)

(72) Inventor: Hongtao Jia, Wuhan (CN)

(73) Assignee: Shengzhou Dingda Machinery Co., Ltd., Shaoxing (CN)

( * ) Notice: Subject to any disclaimer, the term of this patent is extended or adjusted under 35 U.S.C. 154(b) by 0 days.

(21) Appl. No.: 19/301,093

(22) Filed: Aug. 15, 2025

(51) Int. Cl.
*B41F 16/00* (2006.01)
*B41F 16/02* (2006.01)
*B41F 33/00* (2006.01)

(52) U.S. Cl.
CPC ........ *B41F 16/006* (2013.01); *B41F 16/0046* (2013.01); *B41F 16/0086* (2013.01); *B41F 16/0093* (2013.01); *B41F 16/02* (2013.01); *B41F 33/0009* (2013.01)

(58) Field of Classification Search
CPC ................ B41F 16/006; B41F 16/0046; B41F 16/0086; B41F 16/0093; B41F 16/02; B41F 33/0009
See application file for complete search history.

(56) References Cited

U.S. PATENT DOCUMENTS

2015/0122425 A1* 5/2015 Hsiao ........................ B30B 1/04 156/583.1
2021/0252797 A1* 8/2021 Galkin ................ B41F 16/0046

* cited by examiner

*Primary Examiner* — Christopher E Mahoney
*Assistant Examiner* — Marissa Ferguson-Samreth
(74) *Attorney, Agent, or Firm* — JEEN IP LAW, LLC

(57) ABSTRACT

Disclosed is a liftable and rotatable multifunctional thermal transfer printer. The thermal transfer printer includes a rack; a lifting and rotating mechanism mounted on the rack and including a driving motor, a fixing sleeve and a screw rod, where a nut seat is mounted on the screw rod, a lifting sleeve rod is fixed on the nut seat, a guide column is fixed outside the lifting sleeve rod, the fixing sleeve sleeves the lifting sleeve rod, a guide channel is arranged on the fixing sleeve, the guide channel includes a first guide groove extending in a vertical straight line and a second guide groove spirally coiled and extending upwards in a circumferential direction of the fixing sleeve, and the guide column is placed in the guide channel; a supporting main beam fixed above the lifting sleeve rod; and functional mechanisms detachably mounted below the supporting main beam.

10 Claims, 22 Drawing Sheets

LIFTABLE AND ROTATABLE MULTIFUNCTIONAL THERMAL TRANSFER PRINTER

TECHNICAL FIELD

The present disclosure relates to the technical field of thermal transfer printers, and in particular to a liftable and rotatable multifunctional thermal transfer printer.

BACKGROUND

Thermal transfer printing is also known as sublimation in which any image such as a portrait or a landscape is printed on ordinary paper or high-precision printing paper through thermal transfer printing ink, and then the paper is heated to a certain temperature within a few minutes through a corresponding thermal transfer printing apparatus to transfer an image color on the paper realistically to an object such as a porcelain cup, a porcelain plate, a porcelain plate, clothes, a metal and a hat.

In the prior art, a heat press machine for fabric is capable of transferring various pyrographs onto fabric such as cotton, linen and synthetic fibers through thermal transfer printing, further performing heat treatment of processes such as screen printing, glue application and foaming, and further baking a color code, a portrait photo, a landscape pattern, etc. onto the porcelain plate and a metal plate. A heat press machine for hats is capable of transferring various pyrographs onto a front end of a hat through thermal transfer printing. A heat press machine for cups is capable of transferring various pyrographs onto an outer surface of a cup through thermal transfer printing. It is necessary for people to purchase the heat press machine for fabric, the heat press machine for hats and the heat press machine for cups simultaneously in order to use different thermal transfer printing functions, resulting in a large amount of space occupation. Moreover, when the above apparatuses are operated, for example, it is necessary to place a material on a working platform of the heat press machine for fabric, or place the hat on a material placing plate of the heat press machine for hats, and it is necessary to lift an upper heating plate, or rotate the upper heating plate to one side; and it is necessary to place the cup in a cup baking cavity of the heat press machine for cups, and it is necessary to unlock an inner cavity of the cup baking cavity, some of these operations are basically manually operated, which is quite troublesome. Moreover, a mechanical structure of each apparatus to achieve the above actions is complex even if these operations are automatically operated. So, it is necessary to develop a thermal transfer printer that is capable of integrating various functions and has more convenient operation and more simplified mechanical actions.

SUMMARY

In order to solve the above problem, the present disclosure provides a liftable and rotatable multifunctional thermal transfer printer.

The technical solution used by the present disclosure is as follows: a liftable and rotatable multifunctional thermal transfer printer includes:

- a rack;
- a lifting and rotating mechanism mounted on the rack and including a mounting plate fixed on the rack, and a driving motor and a fixing sleeve fixed on the mounting plate, where the driving motor is used for driving a screw rod arranged in a vertical direction to rotate, a nut seat is mounted on the screw rod, a lifting sleeve rod is fixed on the nut seat, at least one guide column is fixed outside the lifting sleeve rod, the fixing sleeve sleeves the lifting sleeve rod, at least one guide channel is arranged on the fixing sleeve in an extending direction of the fixing sleeve, the guide channel sequentially includes a first guide groove and a second guide groove which are in communication with each other from bottom to top, the first guide groove extends in a vertical straight line, the second guide groove is spirally coiled and extends upwards in a circumferential direction of the fixing sleeve, and the guide column is cooperatively placed in the guide channel;
- a supporting main beam fixedly mounted above the lifting sleeve rod;
- several functional mechanisms at least including a heat press mechanism for fabric, a heat press mechanism for cups, and a heat press mechanism for hats, where one of the functional mechanisms is detachably mounted below the supporting main beam;
- a controller mounted on the rack or outside the rack; and
- an integrated circuit board mounted on the rack, where the driving motor, the functional mechanisms and the controller are electrically connected to the integrated circuit board.

Several optional modes are further provided below, but do not serve as additional limitations to the above general solution, and are merely further supplements or preferences. On the premise of no technical or logical contradiction, each optional mode can be combined separately for the above general solution, or a plurality of optional modes can be combined.

Preferably, two guide columns are arranged and are arranged on opposite sides of the lifting sleeve rod respectively, and two guide channels are arranged and arranged on opposite sides of the fixing sleeve rod respectively.

Preferably, a power supply socket is arranged below one end of the supporting main beam away from the lifting sleeve rod, and slots for allowing the power supply socket to be cooperatively inserted are provided at upper ends of the functional mechanisms.

Preferably, a connecting seat is fixed on the supporting main beam, the power supply socket is fixedly mounted below the connecting seat, connectors are arranged at upper ends of the functional mechanisms, the slots are provided on the connectors, and a quick-release structure is arranged between the connecting seat and the connectors.

Preferably, the quick-release structure includes a quick-release button arranged on the connecting seat, a clamping head is arranged on the connecting seat, clamping openings are provided on upper end surfaces of the connectors, and the quick-release button is used for driving the clamping head to be clamped to or separated from the clamping openings.

Preferably, the rack includes a bottom plate, a positioning block is arranged on the bottom plate, and lower ends of the functional mechanisms are provided with positioning grooves for allowing the positioning block to be placed.

Preferably, a lower housing is arranged above the bottom plate, the mounting plate is fixed on the lower housing, the integrated circuit board and the driving motor are mounted inside the lower housing, an upper housing is fixed above the lower housing, the fixing sleeve is fixed in the upper housing, and an upper end of the lifting sleeve rod extends above the upper housing.

Preferably, an electrical jack is provided at a rear end of the lower housing, and the electrical jack is used for externally connecting a power cord.

Preferably, the controller is located outside the rack, the controller is connected to the integrated circuit board by means of an electrical wire, and a switch button and a function switching button are arranged on the controller.

More preferably, an upper end of the supporting main beam is provided with a display panel, and the display panel is electrically connected to the integrated circuit board.

Compared with the prior art, the present disclosure has the following beneficial effects:

1, control of lifting and rotating over the supporting main beam is completed by means of cooperation of the driving motor, the lifting sleeve rod and the fixing sleeve rod. The lifting sleeve rod fixed on the nut seat can be driven to rotate when the driving motor drives the screw rod to rotate. Since the first guide groove and the second guide groove are provided on the fixing sleeve rod, the nut seat normally translates linearly in an extending direction of the screw rod when the guide column on the lifting sleeve rod slides along the first guide groove. In this case, the supporting main beam continues rising. The second guide groove spirally coiled to rise presses the guide column when the guide column enters the second guide groove, such that the lifting sleeve rod and the nut on the nut seat are driven to rotate together relative to the screw rod. In this case, the supporting main beam rotates while continuing rising such that materials can be conveniently placed on the functional mechanisms, a mechanical action is simplified, and operation is convenient; and 2, by fixedly arranging the power supply socket on the supporting main beam, it is only necessary to directly align the power supply socket with the slots on the connectors for insertion when the functional mechanisms need to be replaced to complete mounting. In this case, the functional mechanisms have been energized. It is unnecessary to additionally insert a plug anew after mounting is completed, such that operation is more convenient.

BRIEF DESCRIPTION OF THE DRAWINGS

In order to more clearly describe the technical solutions in the examples of the present disclosure or in the prior art, the accompanying drawings required for the description of the examples or the prior art will be briefly introduced below. Obviously, the accompanying drawings in the following description are merely some examples of the present disclosure. Those of ordinary skill in the art would further be able to derive other accompanying drawings from these accompanying drawings without making creative efforts.

Figure 1:
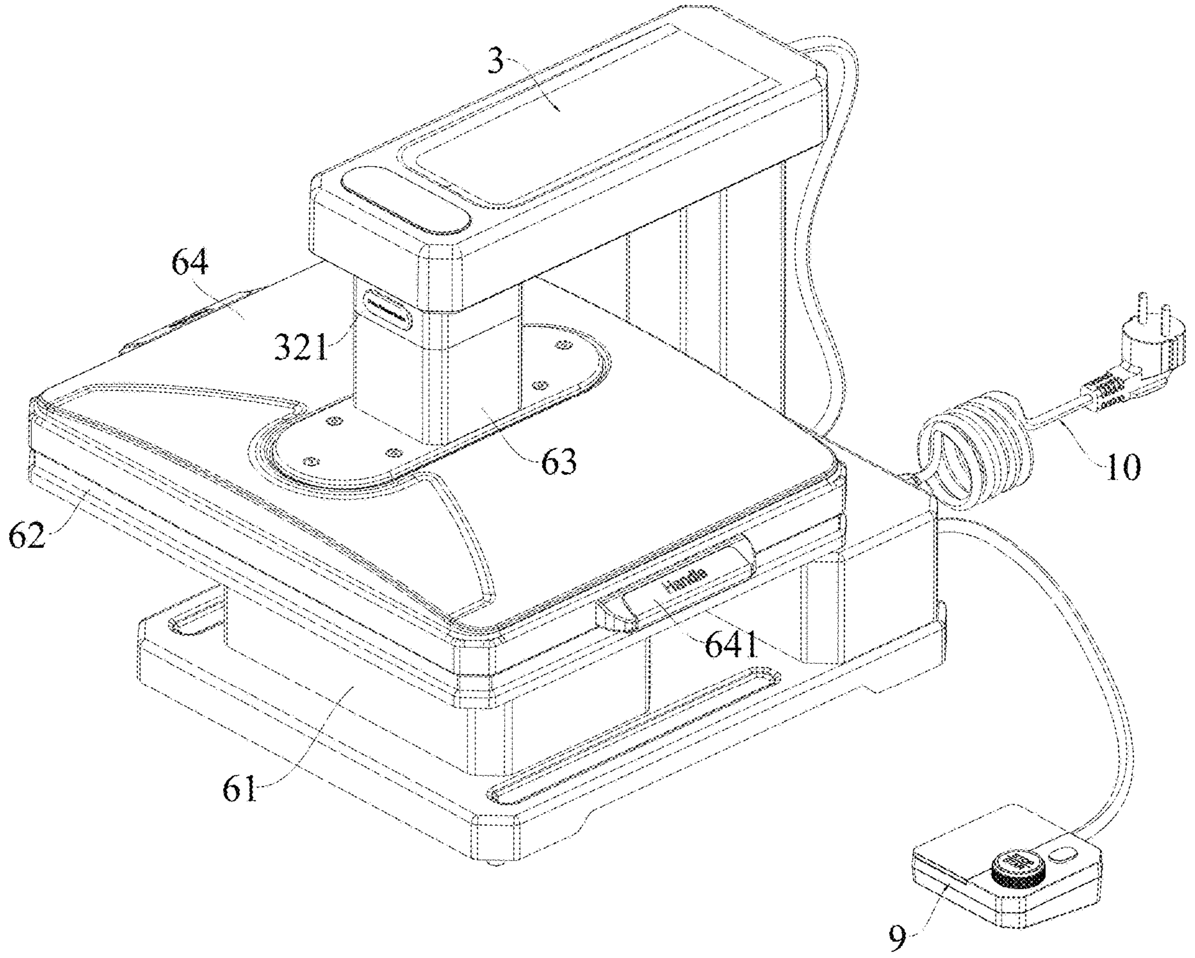
FIG. 1 is an overall structural diagram from a front perspective showing that a heat press mechanism for fabric is selected as a functional mechanism according to an example of the present application.
Figure 2:
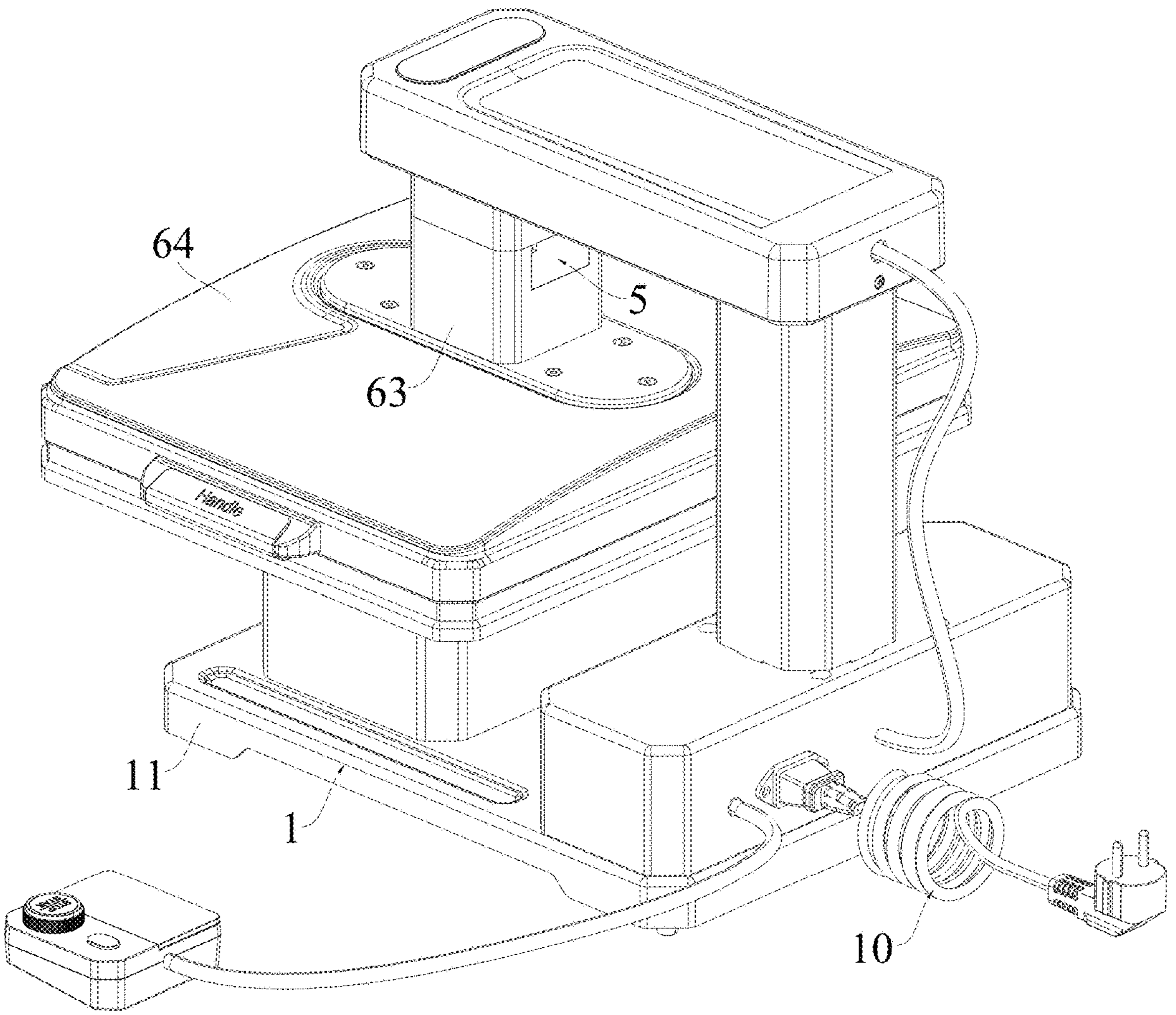
FIG. 2 is an overall structural diagram from a rear perspective showing that a heat press mechanism for fabric is selected as a functional mechanism according to an example of the present application.
Figure 3:
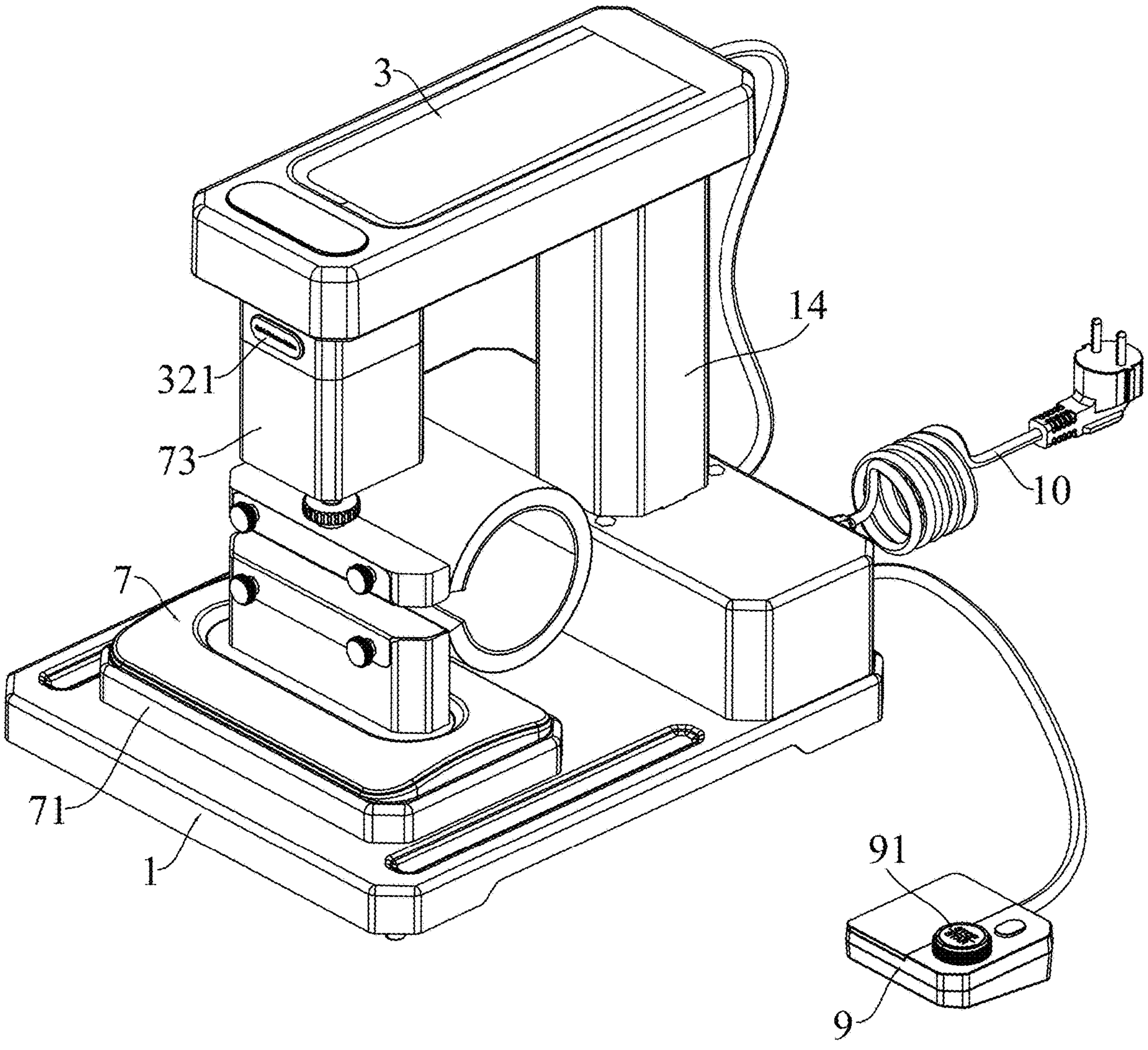
FIG. 3 is an overall structural diagram from a front perspective showing that a heat press mechanism for cups is selected as a functional mechanism according to an example of the present application.
Figure 4:
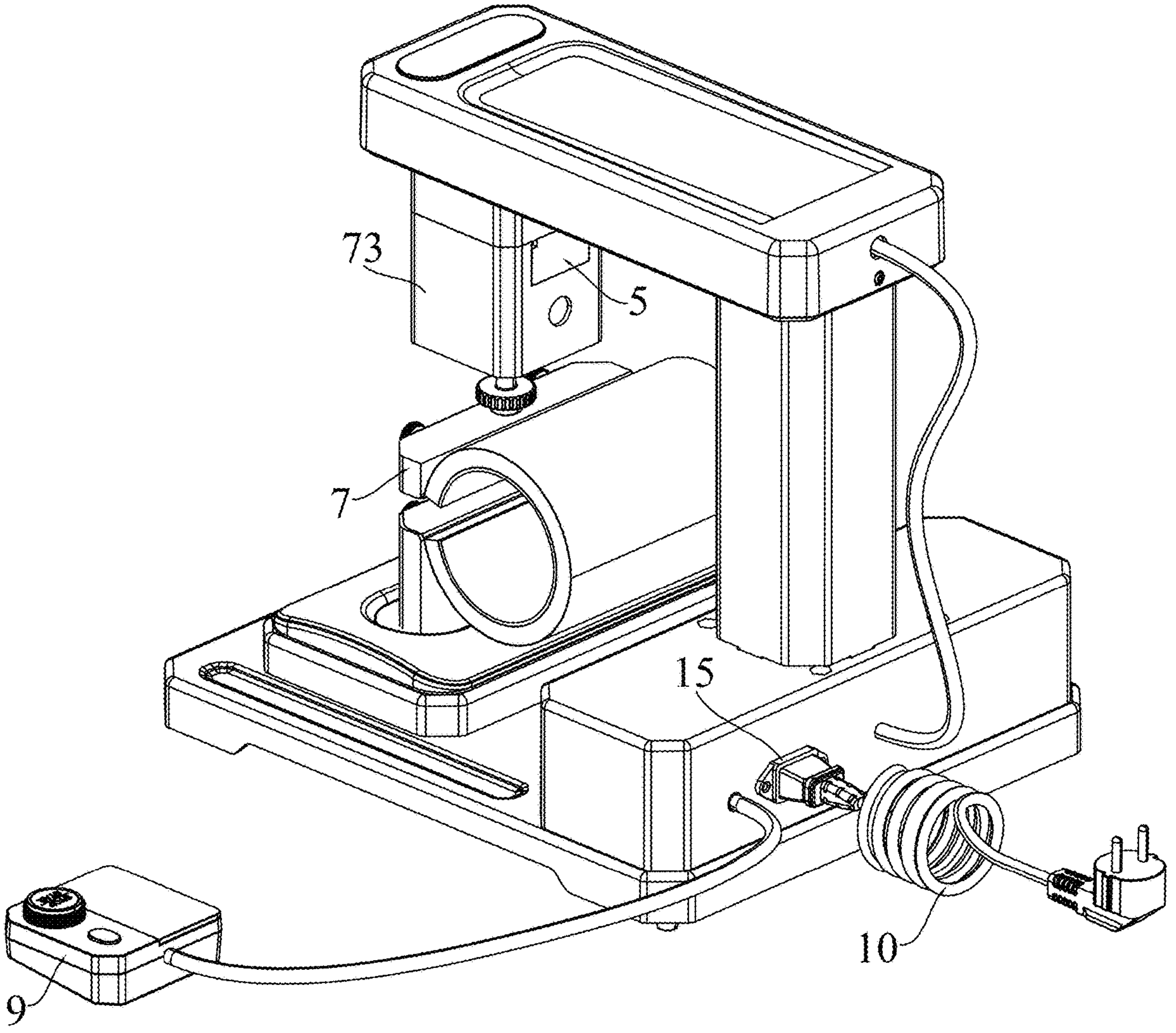
FIG. 4 is an overall structural diagram from a rear perspective showing that a heat press mechanism for cups is selected as a functional mechanism according to an example of the present application.
Figure 5:
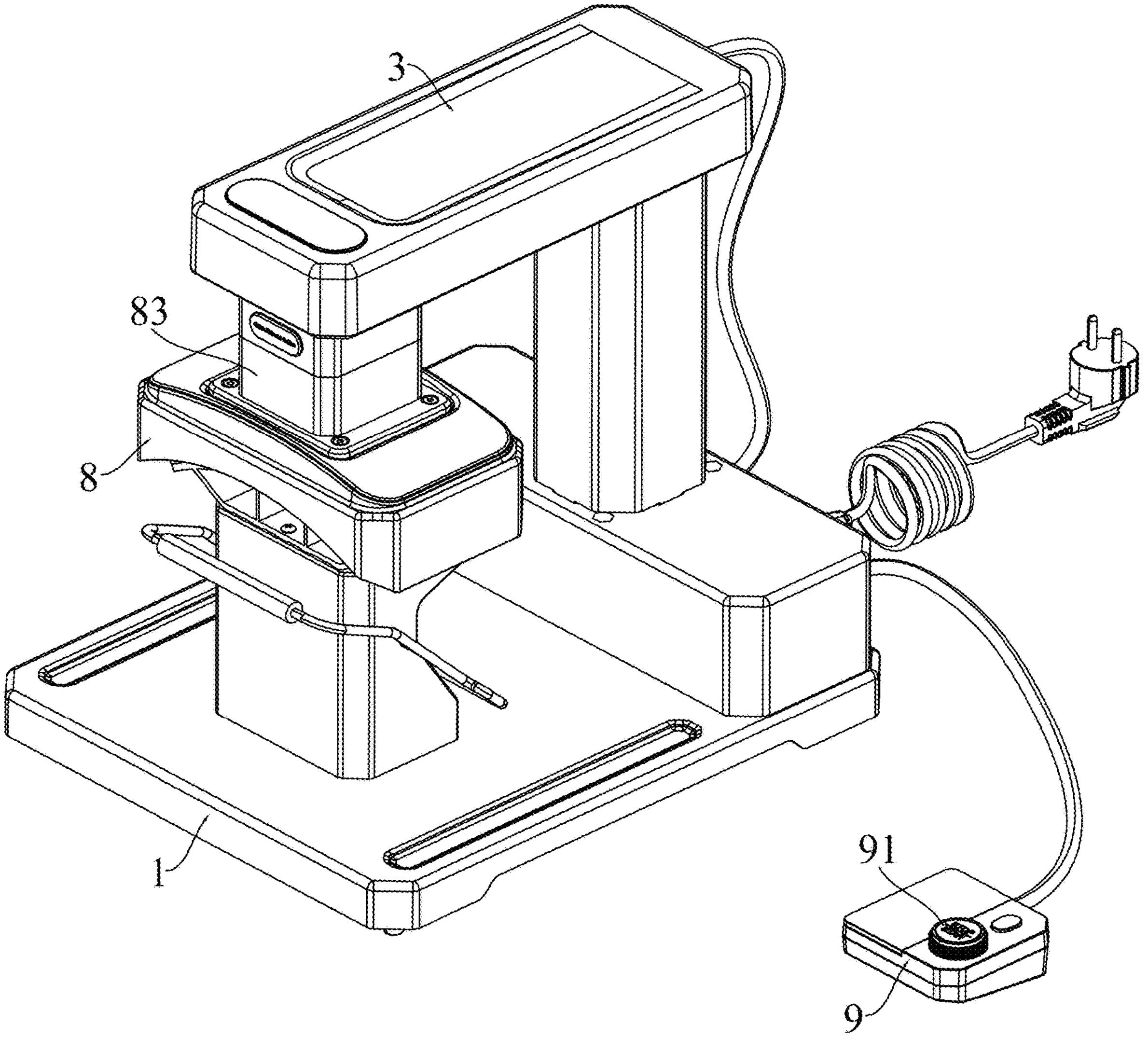
FIG. 5 is an overall structural diagram from a front perspective showing that a heat press mechanism for hats is selected as a functional mechanism according to an example of the present application.

Reference numerals in the figures are as follows: 1—rack, 11—bottom plate, 12—lower housing, 13—positioning block, 14—upper housing, 15—electrical jack, 2—lifting and rotating mechanism, 21—mounting plate, 211—motor fixing plate, 22—driving motor, 23—screw rod, 24—nut seat, 25—lifting sleeve rod, 26—guide column, 27—fixing sleeve, 271—first guide groove, 272—second guide groove, 3—supporting main beam, 31—display panel, 32—connecting seat, 321—quick-release button, 3211—pressing block, 322—clamping head, 4—integrated circuit board, 5—power supply socket, 6—heat press mechanism for fabric, 61—first base, 611—first positioning groove, 62—lower supporting plate, 63—first connector, 631—first slot, 632—first clamping opening, 64—upper pressing plate, 641—gripping block, 7—heat press mechanism for cups, 71—second base, 711—second positioning groove, 72—cup placing assembly, 721—fixing edge strip, 73—second connector, 731—second slot, 732—second clamping opening, 74—pressing rod, 8—heat press mechanism for hats, 81—third base, 811—third positioning groove, 82—material placing plate, 83—third connector, 831—third slot, 832—third clamping opening, 84—upper heating disc, 85—hat fixing assembly, 9—controller, 91—switch button, and 10—power cord.

The achievement of the objective, functional features and advantages of the present disclosure will be further described in combination with the examples and with reference to the accompanying drawings.

DETAILED DESCRIPTIONS OF THE EMBODIMENTS

The technical solutions in the examples of the present disclosure are clearly and completely described below in combination with the accompanying drawings in the examples of the present disclosure. Apparently, the examples described are merely some examples rather than all examples of the present disclosure. Based on the examples in the present disclosure, all other examples obtained by those of ordinary skill in the art without making creative efforts fall within the scope of protection of the present disclosure.

It should be noted that all directional indications (such as upper, lower, left, right, front and rear) in the examples of the present disclosure are merely used to explain the relative position relations and motion situations between components in a specific posture (as shown in the accompanying drawings). If the specific posture is changed, the directional indications are also changed accordingly.

In addition, the descriptions of "first", "second", etc. involved in the present disclosure are for descriptive purposes merely and are not to be construed as indicating or implying their relative importance or implicitly specifying the number of indicated technical features. Thus, a feature defined with "first" and "second" can explicitly or implicitly include at least one of the features. In addition, the technical solutions of the examples can be combined with one another, which must be based on the achievement by those of ordinary skill in the art, and when the combinations of the technical solutions contradict one another or cannot be achieved, it should be considered that the combinations of the technical solutions do not exist and do not fall within the scope of protection claimed in the present disclosure.

Specific implementation solution is as follows: with reference to FIGS. 1-21, the present disclosure provides a liftable and rotatable multifunctional thermal transfer printer. The liftable and rotatable multifunctional thermal transfer printer includes:

a rack 1;

a lifting and rotating mechanism 2 mounted on the rack 1 and including a mounting plate 21 fixed on the rack 1, and a driving motor 22 and a fixing sleeve 27 fixed on the mounting plate 21, where the driving motor 22 is used for driving a screw rod 23 arranged in a vertical direction to rotate, a nut seat 24 is mounted on the screw rod 23, a lifting sleeve rod 25 is fixed on the nut seat 24, at least one guide column 26 is fixed outside the lifting sleeve rod 25, the fixing sleeve 27 sleeves the lifting sleeve rod 25, at least one guide channel is arranged on the fixing sleeve 27 in an extending direction of the fixing sleeve, the guide channel sequentially includes a first guide groove 271 and a second guide groove 272 which are in communication with each other from bottom to top, the first guide groove extends in a vertical straight line, the second guide groove 272 is spirally coiled and extends upwards in a circumferential direction of the fixing sleeve 27, and the guide column 26 is cooperatively placed in the guide channel;

a supporting main beam 3 fixedly mounted above the lifting sleeve rod 25;

several functional mechanisms at least including a heat press mechanism for fabric 6, a heat press mechanism for cups 7, and a heat press mechanism for hats 8, where one of the functional mechanisms is detachably mounted below the supporting main beam 3;

a controller 9 mounted on the rack 1 or outside the rack 1; and an integrated circuit board 4 mounted on the rack 1, where the driving motor 22, the functional mechanisms and the controller 9 are electrically connected to the integrated circuit board 4.

With reference to FIGS. 10-13, it can be seen that in the example, two guide columns 26 are arranged and are arranged on opposite sides of the lifting sleeve rod 25 respectively, and two guide channels are arranged and arranged on opposite sides of the fixing sleeve rod respectively.

Figure 10:
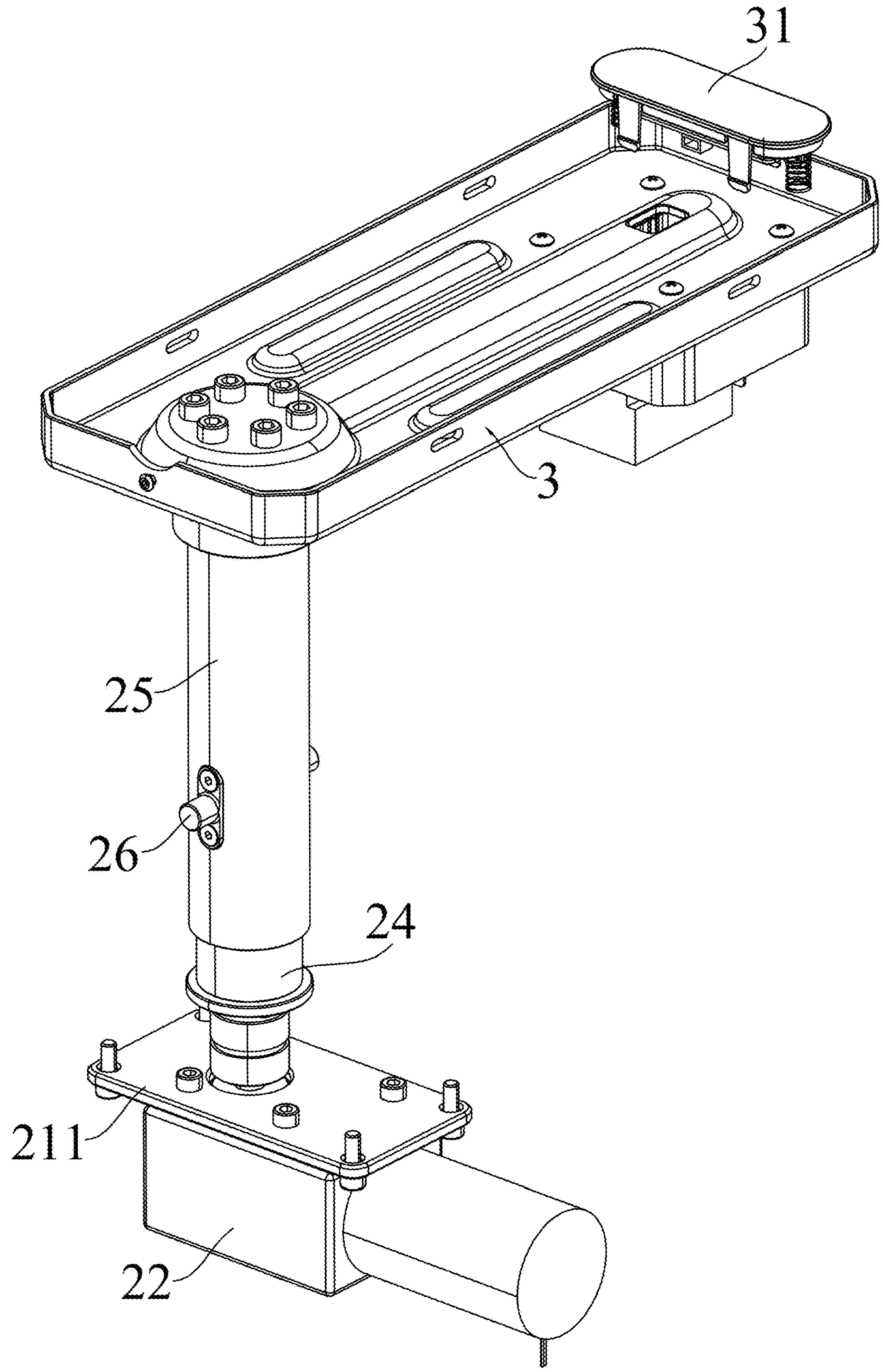
FIG. 10 is an assembly structural diagram of a lifting and rotating mechanism and a supporting main beam after a fixing sleeve is hidden according to an example of the present application.
Figure 11:
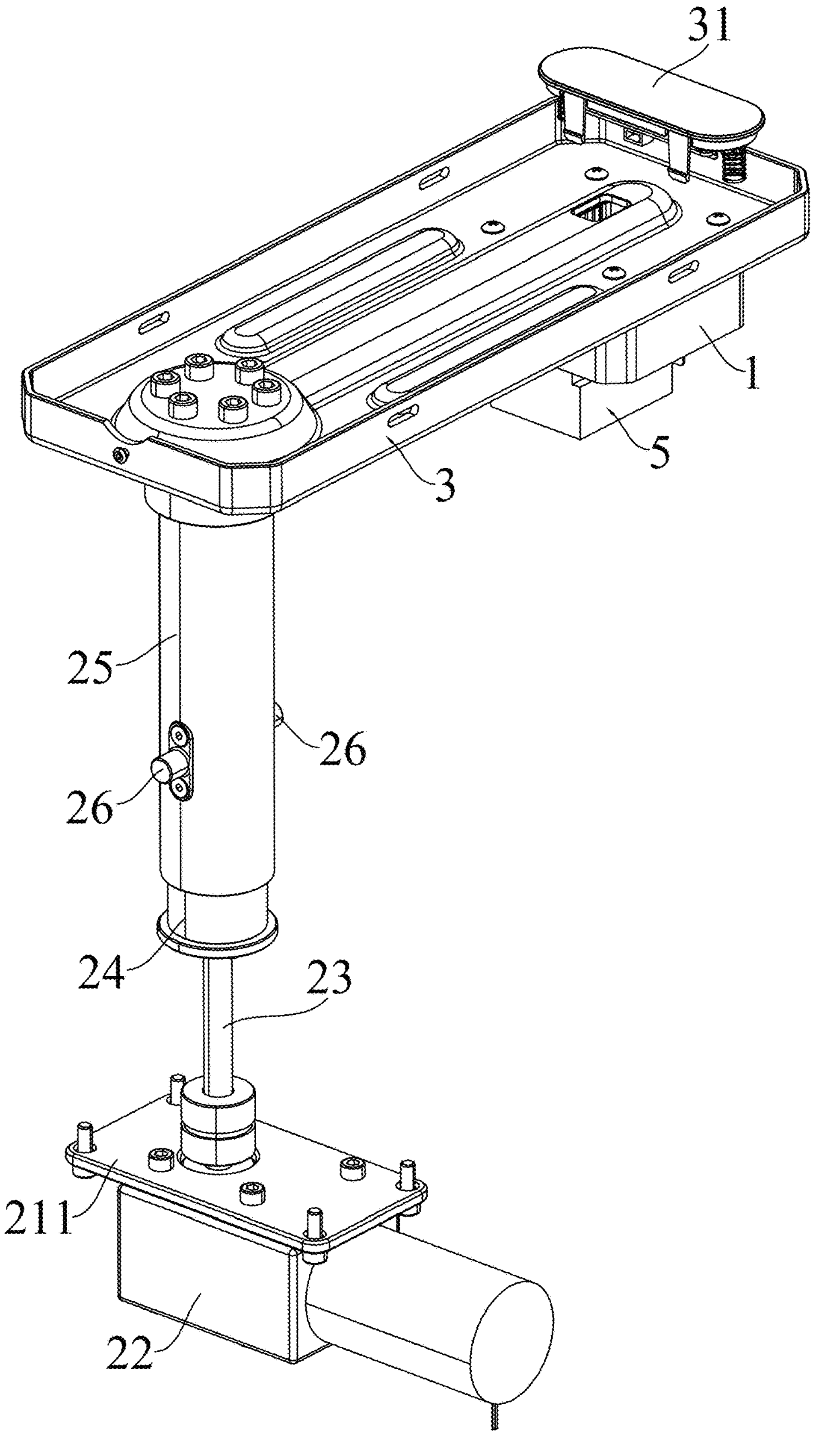
FIG. 11 is an assembly structural diagram after the supporting main beam rises in FIG. 10.
Figure 12:
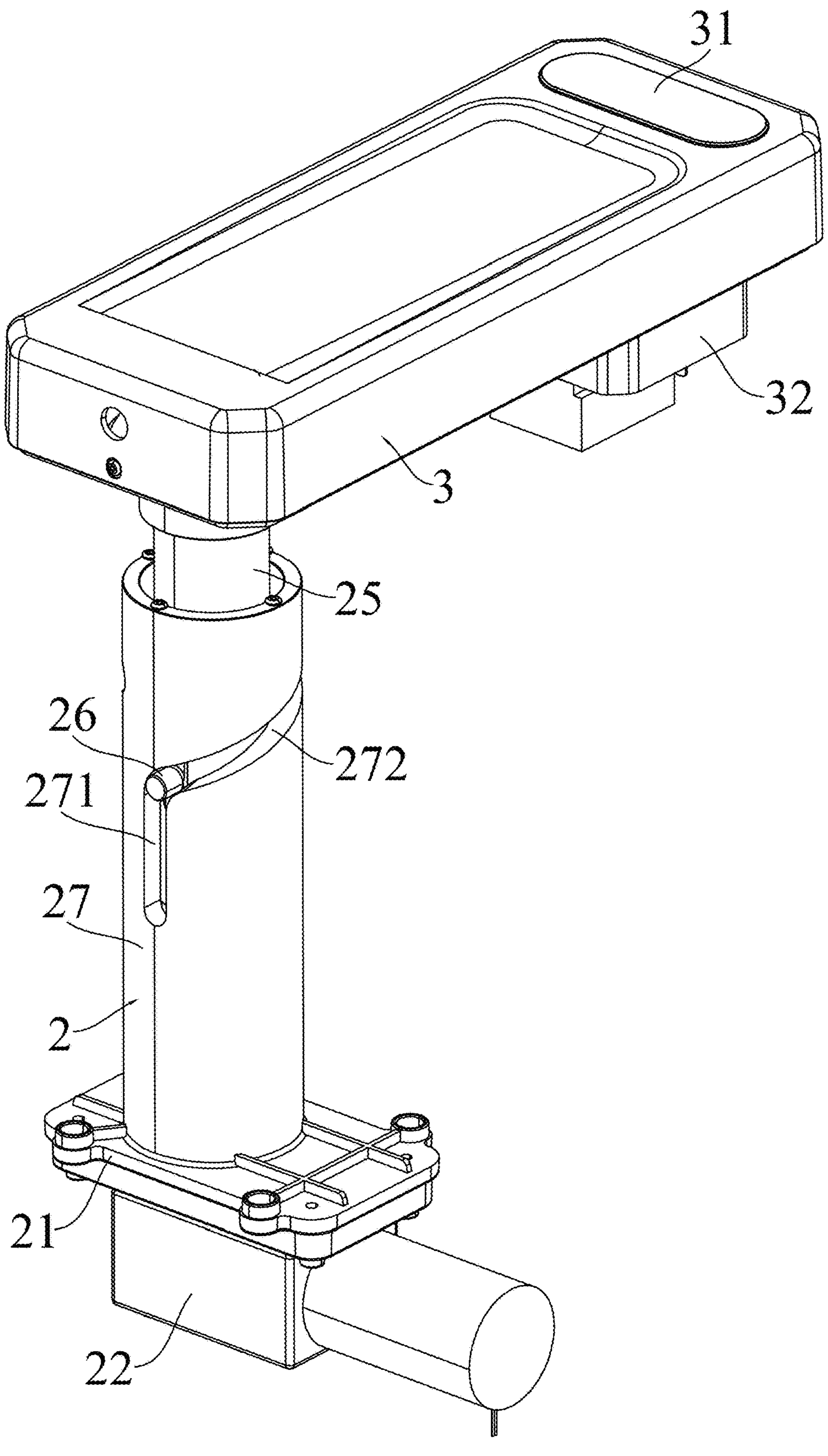
FIG. 12 is an assembly structural diagram of a lifting and rotating mechanism and a supporting main beam when a guide column is located at a joint between a first guide groove and a second guide groove according to an example of the present application.
Figure 13:
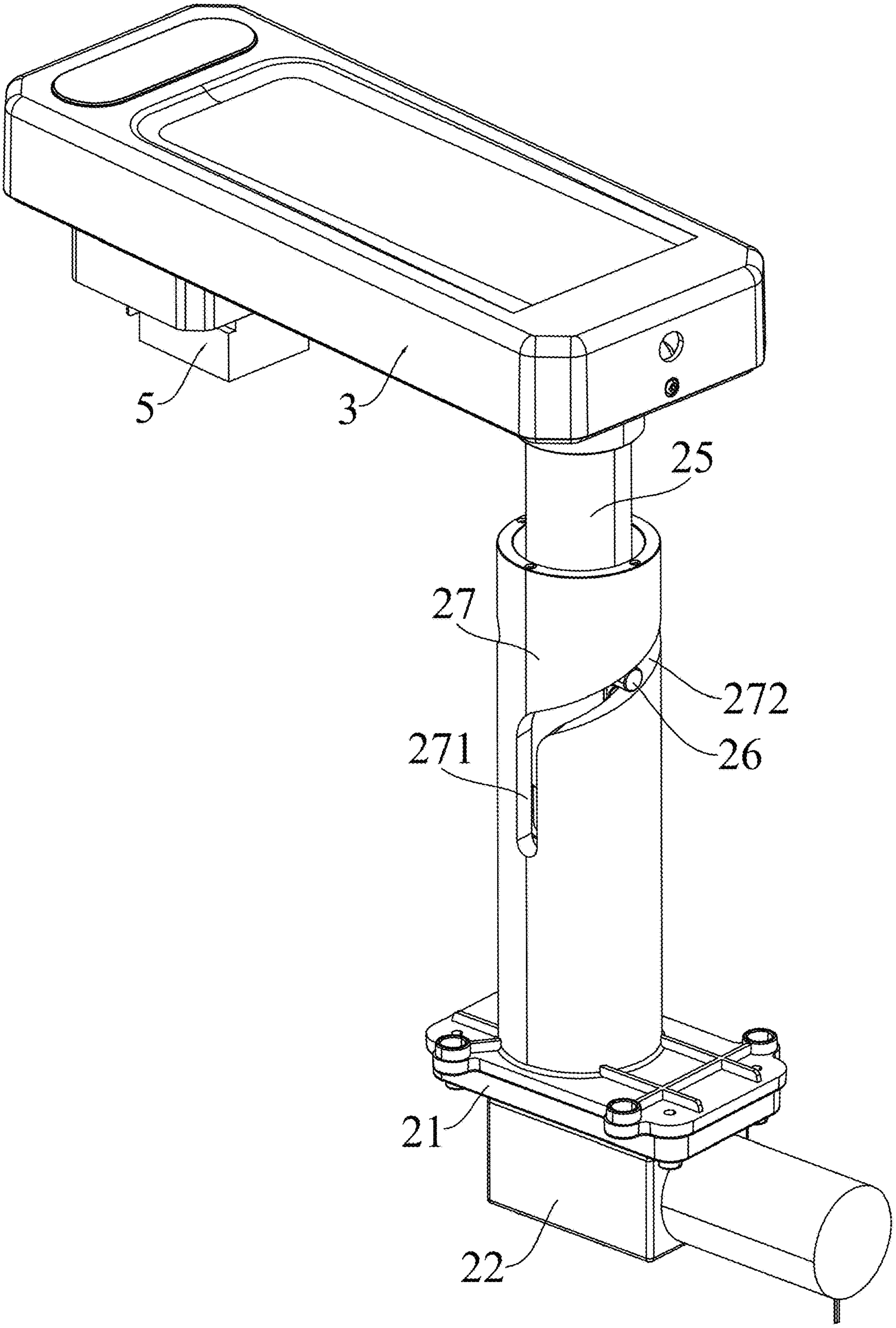
FIG. 13 is an assembly structural diagram of a lifting and rotating mechanism and a supporting main beam when a guide column is located in a second guide groove according to an example of the present application.

A working principle of the lifting and rotating mechanism 2 is as follows: with reference to FIGS. 10 and 11, the driving motor 22 is controlled to work by means of the controller 9. Then, the driving motor 22 drives the screw rod 23 to rotate. The nut seat 24 is mounted on a lead screw (in the example, a structure of a ball screw rod 23 may be used as a connecting structure between the screw rod 23 and the nut seat 24), and the lifting sleeve rod 25 is fixed on the nut seat 24, such that the nut seat 24 and the lifting sleeve rod 25 are driven to translate upwards together along the screw rod 23. Continuously, with reference to FIGS. 9, 12 and 13, it can be seen that in the example, the fixing sleeve 27 is fixed on the mounting plate 21, at least one guide channel is arranged on the fixing sleeve 27 in the extending direction of the fixing sleeve, and the fixing sleeve rod sleeves the lifting sleeve rod 25. Thus, the guide column 26 fixed outside the lifting sleeve rod 25 firstly translates linearly along the first guide groove 271 in a process that the nut seat 24 and the lifting sleeve rod 25 rise together. In the process, the supporting main beam 3 fixed above the lifting sleeve rod 25 is merely lifted upwards without rotating.

When the guide column 26 enters the second guide groove 272, since the second guide groove 272 is configured to be spirally coiled and extend upwards in the circumferential direction of the fixing sleeve 27, an inner groove wall of the second guide groove 272 presses the guide column 26 in a process that the lifting sleeve rod 25 continues rising (Note that in the example, a bearing sleeve rotatably sleeves the nut seat 24, the fixing sleeve rod is fixed on the bearing sleeve, and the bearing sleeve may rotate relative to the nut seat 24 when being subjected to an external force), such that the fixing sleeve 27 rotates, and the bearing sleeve fixed to the fixing sleeve 27 rotates relative to the nut seat 24. In the process, a supporting beam rod fixed above the lifting sleeve rod 25 rotates while being lifted upwards.

Figure 17:
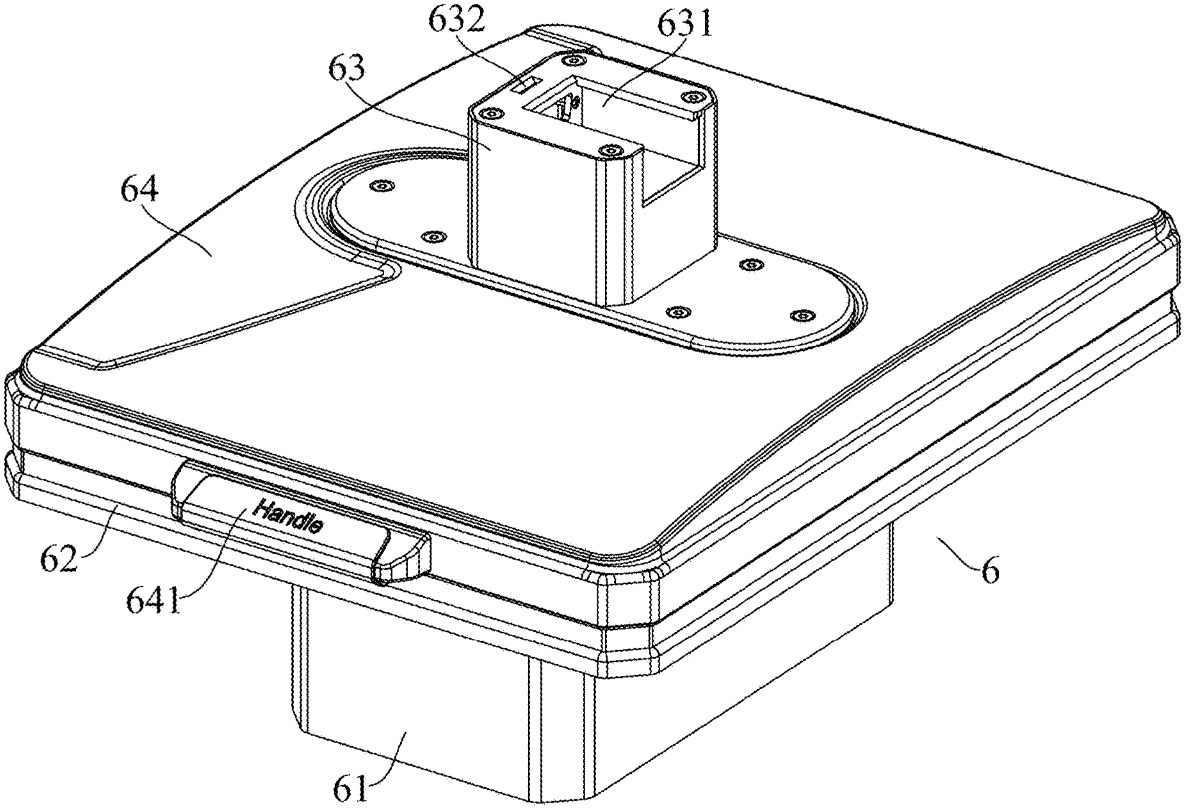
FIG. 17 is an overall diagram of a heat press mechanism for fabric from an upper perspective according to an example of the present application.
Figure 18:
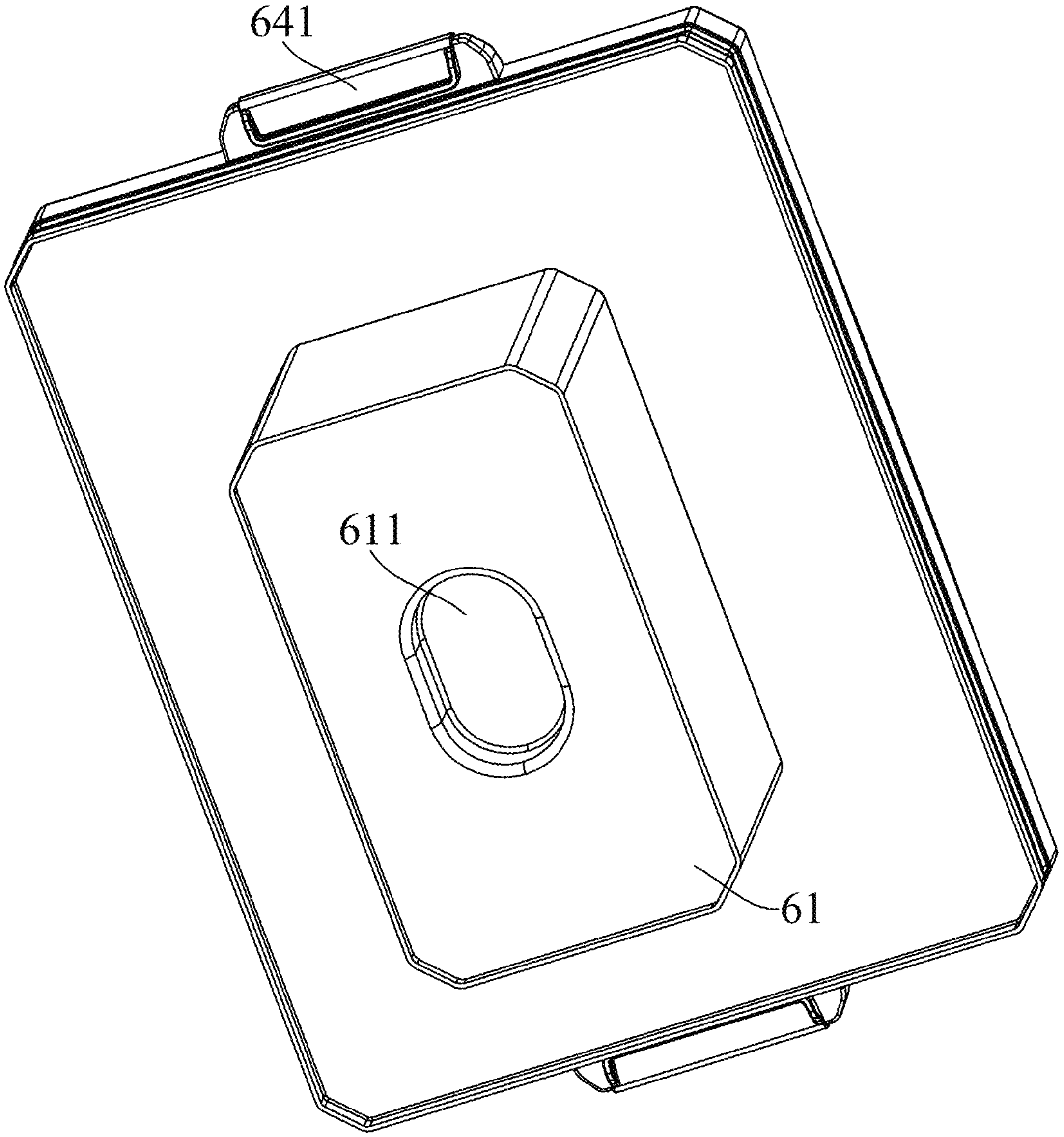
FIG. 18 is an overall diagram of a heat press mechanism for fabric from a lower perspective according to an example of the present application.
Figure 19:
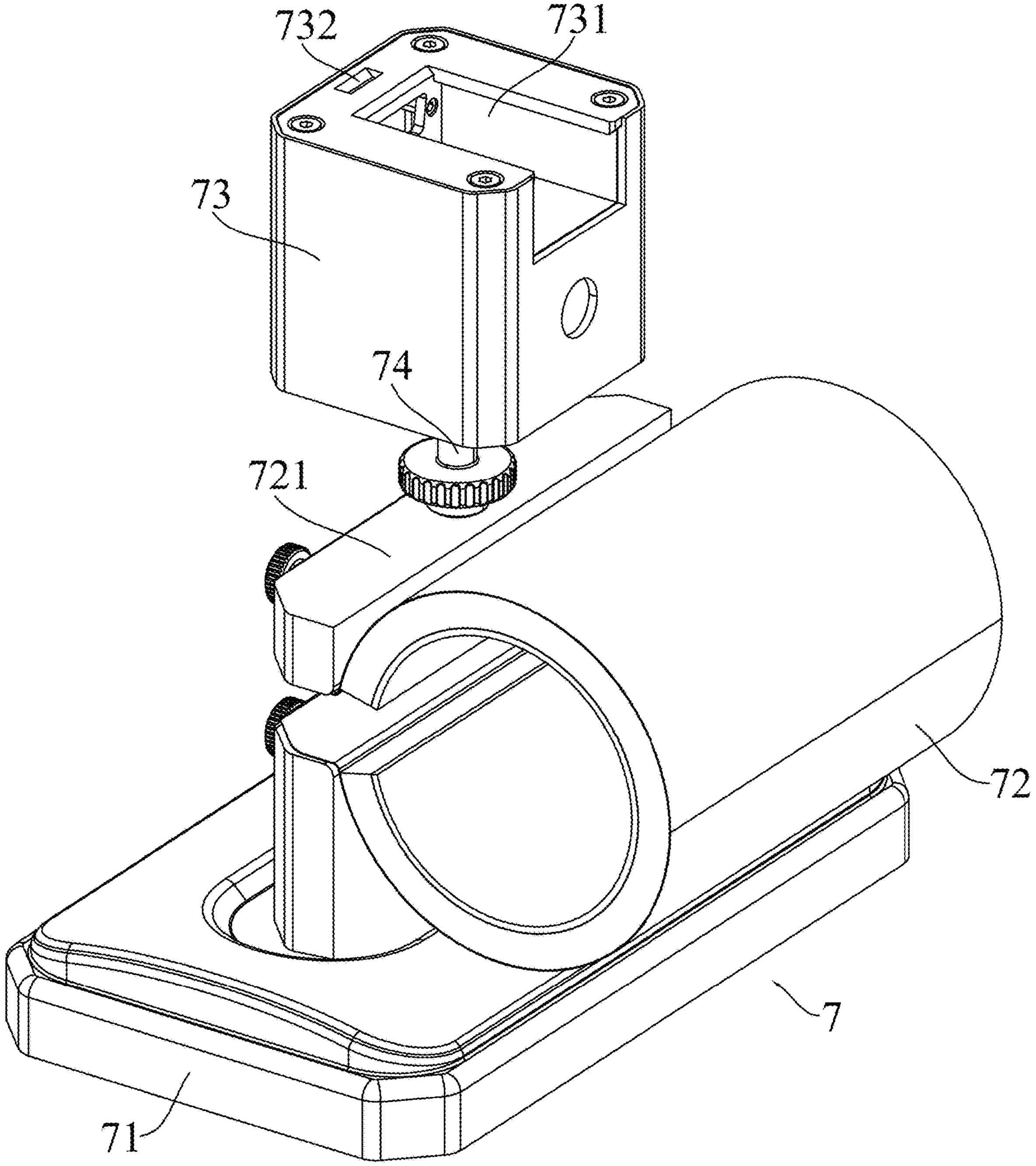
FIG. 19 is an overall diagram of a heat press mechanism for cups from an upper perspective according to an example of the present application.
Figure 20:
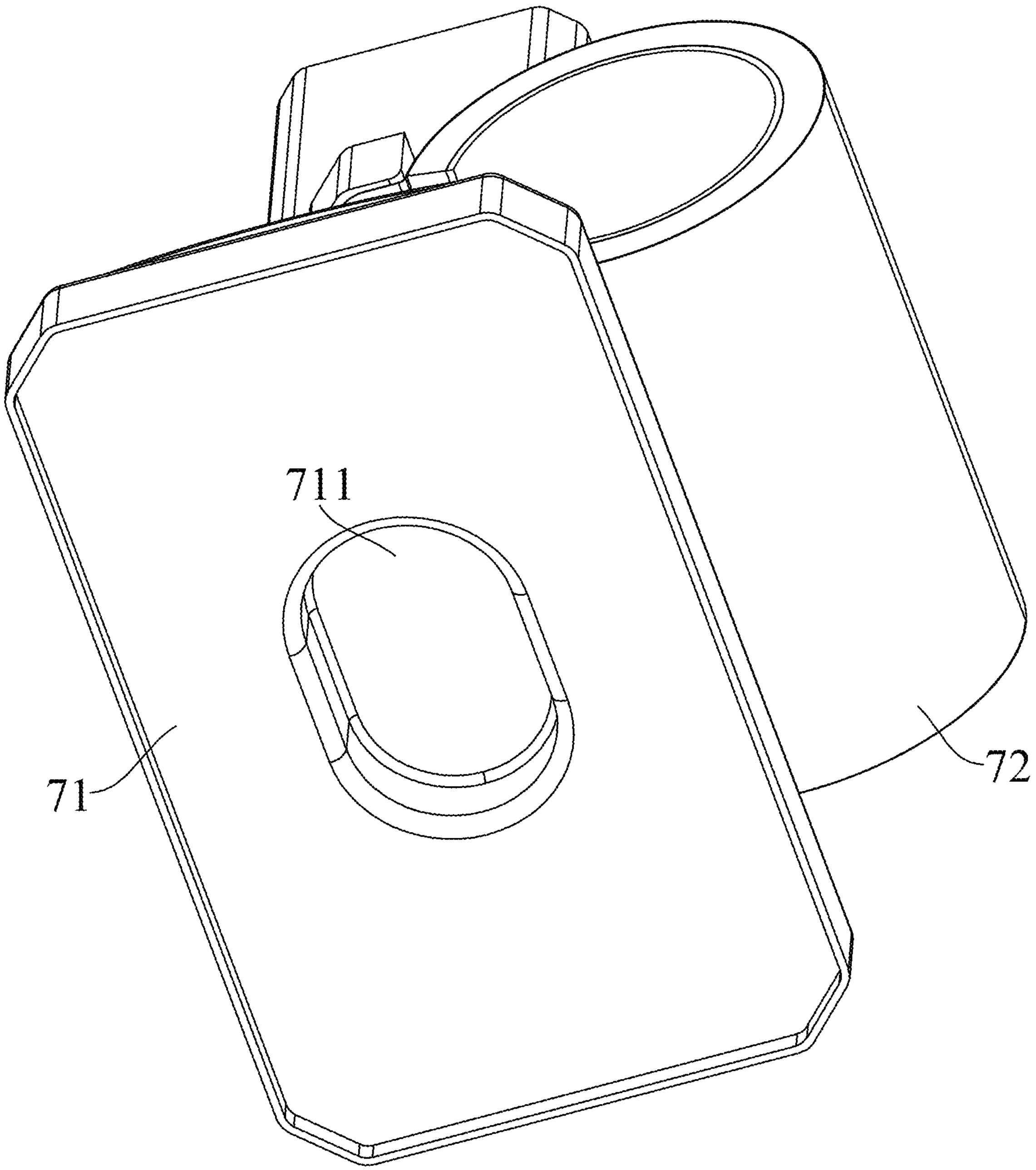
FIG. 20 is an overall diagram of a heat press mechanism for cups from a lower perspective according to an example of the present application.
Figure 21:
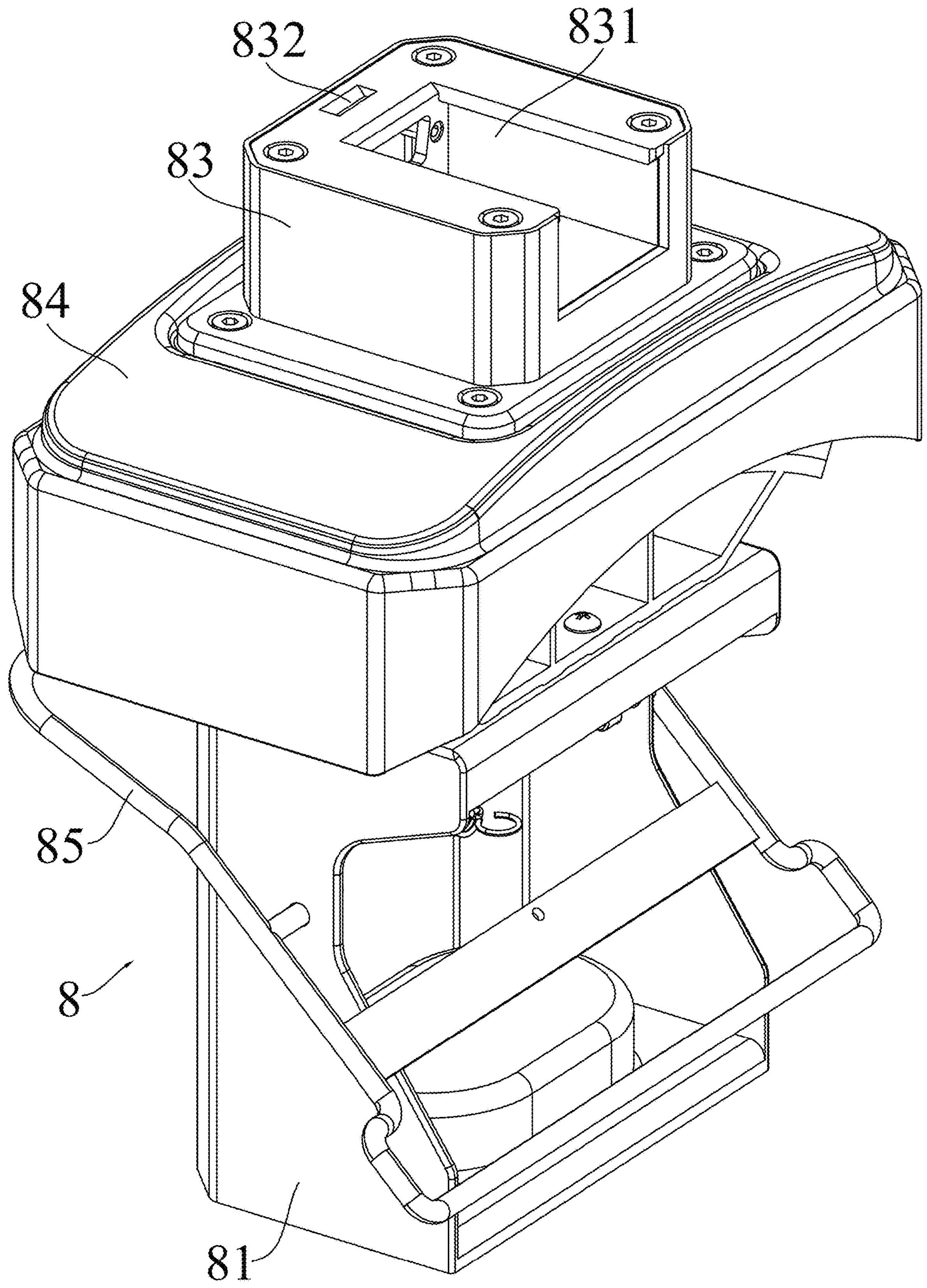
FIG. 21 is an overall diagram of a heat press mechanism for hats from an upper perspective according to an example of the present application.
Figure 22:
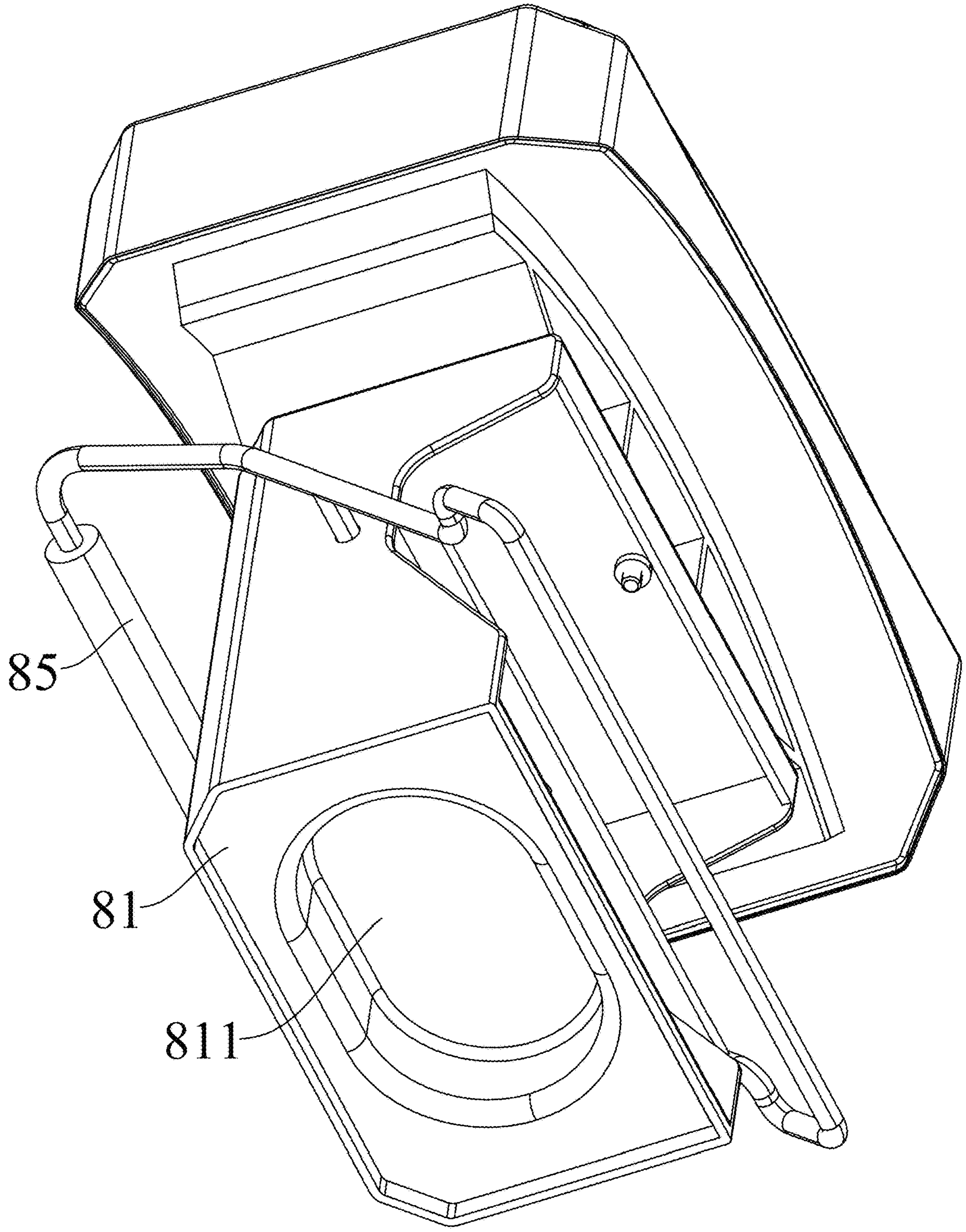
FIG. 22 is an overall diagram of a heat press mechanism for hats from a lower perspective according to an example of the present application.

In a preferred embodiment of the example, with reference to FIGS. 8, 14 and 17, it can be seen that in the example, a power supply socket 5 is arranged below one end of the supporting main beam 3 away from the lifting sleeve rod 25, and slots for allowing the power supply socket 5 to be cooperatively inserted are provided at upper ends of the functional mechanisms.

Herein, the power supply socket 5 is connected to the integrated circuit board 4 by means of an electrical wire. Thus, when it is necessary to mount the functional mechanisms, the slots located at the upper ends of the functional mechanisms are aligned with the power supply socket 5, and the power supply socket is cooperatively inserted into the slots to mount the functional mechanisms. In this case, the functional mechanisms are energized.

Then, a connecting seat 32 is fixed on the supporting main beam 3, the power supply socket 5 is fixedly mounted below the connecting seat 32, connectors are arranged at upper ends of the functional mechanisms, the slots are provided on the connectors, and a quick-release structure is arranged between the connecting seat 32 and the connectors.

Note that a mounting process does not interfere with the rack 1 and conforms to operation habits of a user in order to conveniently connect the connectors and the power supply socket 5. In the example, the power supply socket 5 is inserted into the slots in a horizontal direction.

Figure 8:
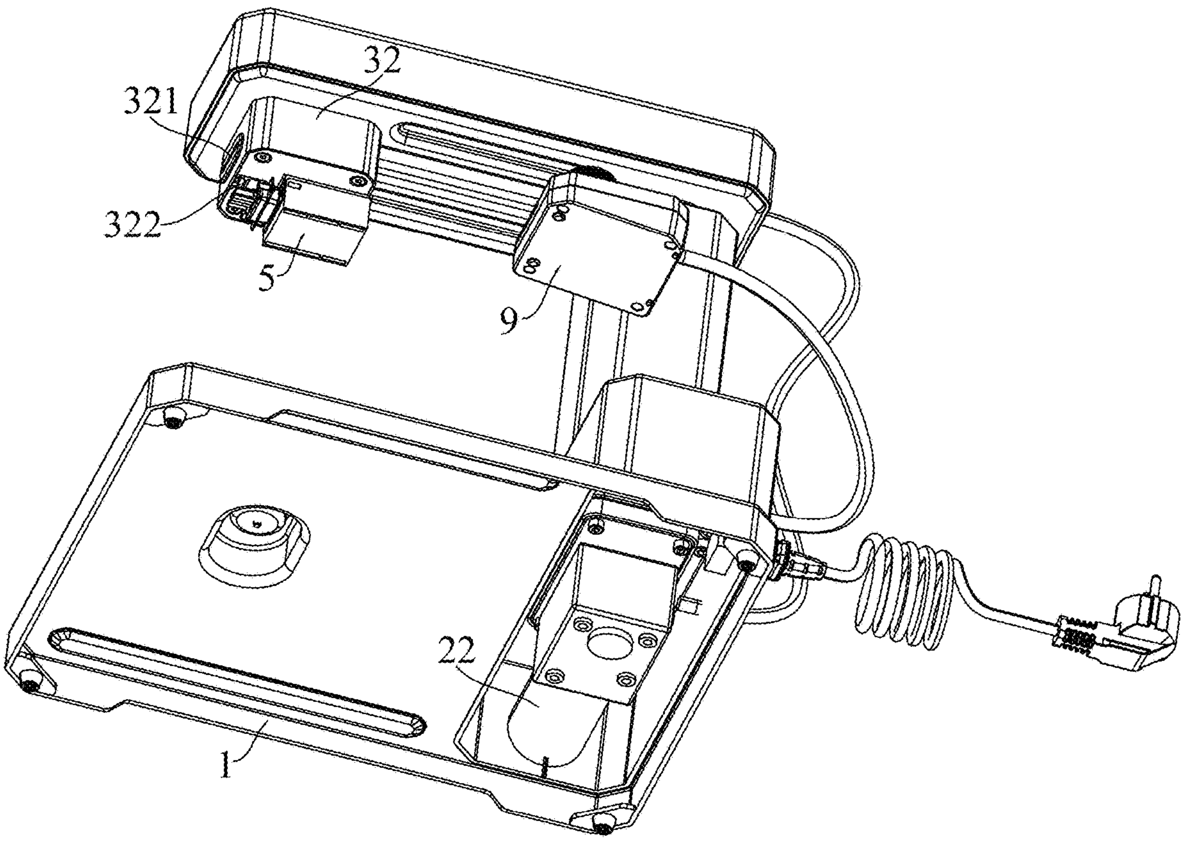
FIG. 8 is an overall structural diagram of a lower side after functional mechanisms are removed according to an example of the present application.
Figure 14:
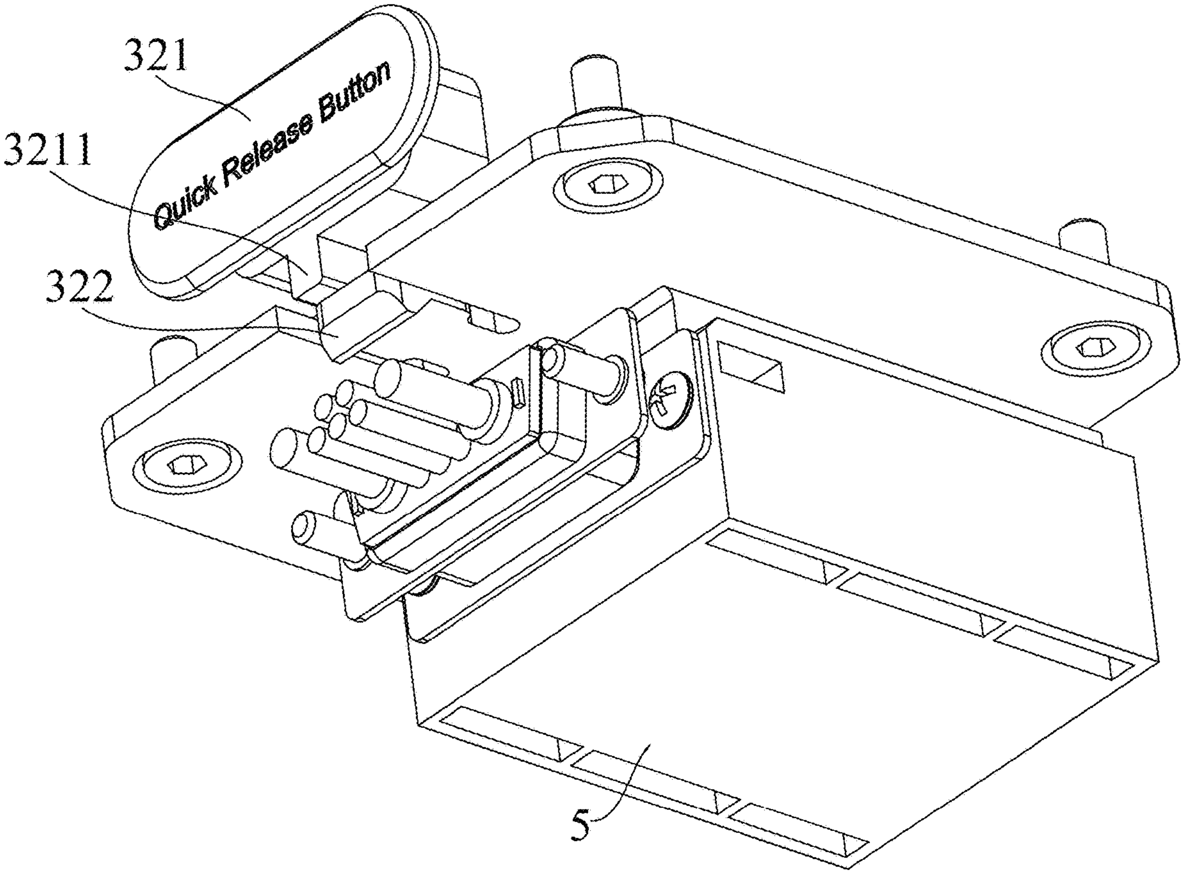
FIG. 14 is an assembly structural diagram of a power supply socket and part of a connecting seat according to an example of the present application.

With reference to FIGS. 8 and 14, it can be seen that the quick-release structure includes a quick-release button 321 arranged on the connecting seat 32, a clamping head 322 is arranged on the connecting seat 32, clamping openings are provided on upper end surfaces of the connectors, and the quick-release button 321 is used for driving the clamping head 322 to be clamped to or separated from the clamping openings.

A working principle of the quick-release mechanism is as follows: in the example, the clamping head 322 is arranged on the connecting seat 32 in a form of an elastic piece, the quick-release button 321 is connected to a pressing block 3211 extending downwards, and a rebound device is arranged between the quick-release button 321 and an interior of the connecting seat 32. The clamping head 322 is located just above the clamping openings when the power supply socket 5 is fully inserted into the slots. The quick-release button 321 is pressed, such that the pressing block 3211 may press the clamping head 322 downwards, and the clamping head 322 deforms downwards and is clamped into the clamping openings, and the power supply socket 5 may be restricted from being separated from the slots.

When the connectors need to be removed from the connecting seat 32, the user only needs to press the quick-release button 321, and the quick-release button 321 rebounds, such that the pressing block 3211 cancels pressing of the clamping head 322, the clamping head 322 recovers deformation, and is separated from the clamping openings. In this case, the user may withdraw the connectors from the power supply socket 5 in a horizontal direction.

Herein, a structural design of the quick-release button 321 and an assembly mode between the power supply socket 5 and the connectors are mainly used for conveniently replacing the functional mechanisms, and the user may select the functional mechanisms required according to requirements, and may complete replacement efficiently and conveniently.

Then, with reference to FIGS. 17-22, it can be seen that in the example, the rack 1 includes a bottom plate 11, a positioning block 13 is arranged on the bottom plate 11, and lower ends of the functional mechanisms are provided with positioning grooves for allowing the positioning block 13 to be placed.

In order to better understand working mechanisms of various functional mechanisms, replacement modes and working principles of the heat press mechanism for fabric 6, the heat press mechanism for cups 7 and the heat press mechanism for hats 8 are described below.

When the heat press mechanism for fabric 6 is selected as the functional mechanism, with reference to FIGS. 1, 2, 17 and 18, for convenience of description, a connector located on the heat press mechanism for fabric 6 is named as a first connector 63 below, a clamping opening located on the first connector 63 is named as a first clamping opening 632, and a slot located on the first connector 63 is named as a first slot 631.

The heat press mechanism for fabric 6 includes a first base 61 and an upper pressing plate 64. A lower supporting plate 62 is mounted above the first base 61. The first connector 63 is mounted above the upper pressing plate 64, and a first positioning groove 611 is provided on a lower end surface of the first base 61.

When it is necessary to mount the heat press mechanism for fabric 6 between the bottom plate 11 and the supporting main beam 3, for convenience of mounting, generally, the supporting main beam 3 is lifted by means of the lifting and rotating mechanism 2, and then the first connector 63 is mounted on the power supply socket 5. Then, the first base 61 is placed above the bottom plate 11, and the first positioning groove 611 is aligned to be clamped on the positioning block 13, such that it may be ensured that a position of the first base 61 may not shift during use.

Since the upper pressing plate 64 is heavy, in order to conveniently mount the first connector 63 on the power supply socket 5, in the example, a left side and a right side of the upper pressing plate 64 are provided with gripping blocks 641 respectively. When the user may grip the gripping blocks 641 by hand and align the power supply socket 5 to be inserted into the first slot 631 on the first connector 63, the clamping head 322 is clamped into the first clamping opening 632 to complete assembly of the first connector 63 and the power supply socket 5.

Figure 15:
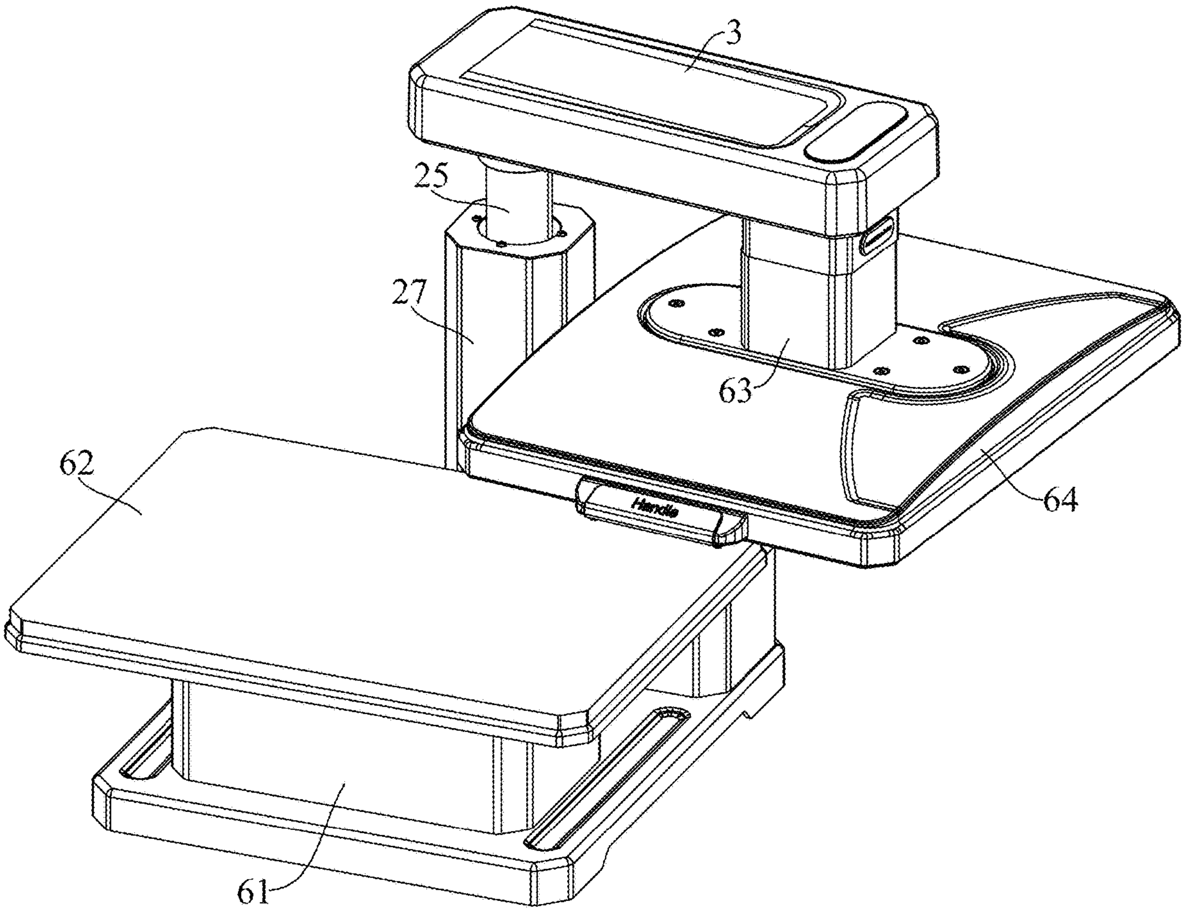
FIG. 15 is an overall structural diagram after a heat press mechanism for fabric is selected as a functional mechanism and an upper pressing plate is lifted and rotated according to an example of the present application.

In the example, when heat press for fabric is needed, firstly, with reference to FIG. 15, it is necessary to lift and rotate the supporting main beam 3 towards one side by controlling the lifting and rotating mechanism 2. In this case, the upper pressing plate 64 is arranged above the lower supporting plate 62 in a staggered manner, such that it is convenient for the user to place a material above the lower supporting plate 62. After it is confirmed that the material is placed in place, the supporting main beam 3 is controlled to descend by means of the lifting and rotating mechanism 2 and rotate to an original position until the upper pressing plate 64 abuts against a position above the material (in this case, the upper pressing plate 64 is energized, and a temperature is increased to a suitable thermoprinting temperature). After the material is thermoprinted, the supporting main beam 3 is driven to lift by means of the lifting and rotating mechanism 2 and rotate towards one side in the same way. In this case, the material may be removed.

When the heat press mechanism for cups 7 is selected as the functional mechanism, with reference to FIGS. 3, 4, 19 and 20, for convenience of description, a connector located on the heat press mechanism for cups 7 is named as a second connector 73 below, a clamping opening located on the second connector 73 is named as a second clamping opening 732, and a slot located on the second connector 73 is named as a second slot 731.

The heat press mechanism for cups 7 includes a second base 71 and a pressing rod 74. A cup placing assembly 72 is mounted above the second base 71, a cup placing cavity for allowing cups to be placed is provided in the cup placing assembly 72, two ends of the cup placing assembly 72 are provided with fixing edge strips 721 respectively, an upper end and a lower end of the pressing rod 74 are fixed on the second connector 73 and one of the fixing edge strips 721 respectively, and a second positioning groove 711 is provided on a lower end surface of the second base 71.

When it is necessary to mount the heat press mechanism for cups 7 between the bottom plate 11 and the supporting main beam 3, for convenience of mounting, generally, the supporting main beam 3 is lifted by means of the lifting and rotating mechanism 2, and then the second connector 73 is mounted on the power supply socket 5. In this case, the clamping head 322 is clamped into the second clamping opening 732. Then, the second base 71 is placed above the bottom plate 11, and the second positioning groove 711 is aligned to be clamped to the positioning block 13, such that it may be ensured that a position of the second base 71 may not shift during use.

In the example, when heat press for cups is needed, firstly, with reference to FIG. 15, it is necessary to lift the supporting main beam 3 by controlling the lifting and rotating mechanism 2 (note that in this case, the guide column 26 translates along the first guide groove 271 and does not enter the second guide groove 272). In this case, the user may place the cups into the cup placing cavity. After it is confirmed that the cups are placed in place, the supporting main beam 3 is controlled to descend by means of the lifting and rotating mechanism 2, and the pressing rod 74 continuously presses down the fixing edge strips 721 to reduce a size of the cup placing cavity until the cups tightly abut against an inner wall of the cup placing cavity. After the cups are baked, the supporting main beam 3 is driven to lift by means of the lifting and rotating mechanism 2 in the same way. In this case, the cups may be removed.

When the heat press mechanism for hats 8 is selected as the functional mechanism, with reference to FIGS. 5, 6, 21 and 22, for convenience of description, a connector located on the heat press mechanism for hats 8 is named as a third connector 83 below, a clamping opening located on the third connector 83 is named as a third clamping opening 832, and a slot located on the third connector 83 is named as a third slot 831.

The heat press mechanism for hats 8 includes a third base 81 and an upper heating disc 84. A material placing plate 82 is mounted above the third base 81, a hat fixing assembly 85 is rotatably mounted on the third base 81, the third connector 83 is mounted above the upper heating disc 84, and a third positioning groove 811 is provided on a lower end surface of the third base 81.

When it is necessary to mount the heat press mechanism for hats 8 between the bottom plate 11 and the supporting main beam 3, for convenience of mounting, generally, the supporting main beam 3 is lifted by means of the lifting and rotating mechanism 2, and then the third connector 83 is mounted on the power supply socket 5. In this case, the clamping head 322 is clamped into the third clamping opening 832. Then, the third base 81 is placed above the bottom plate 11, and the third positioning groove 811 is aligned to be clamped on the positioning block 13, such that it may be ensured that a position of the third base 81 may not shift during use.

Figure 16:
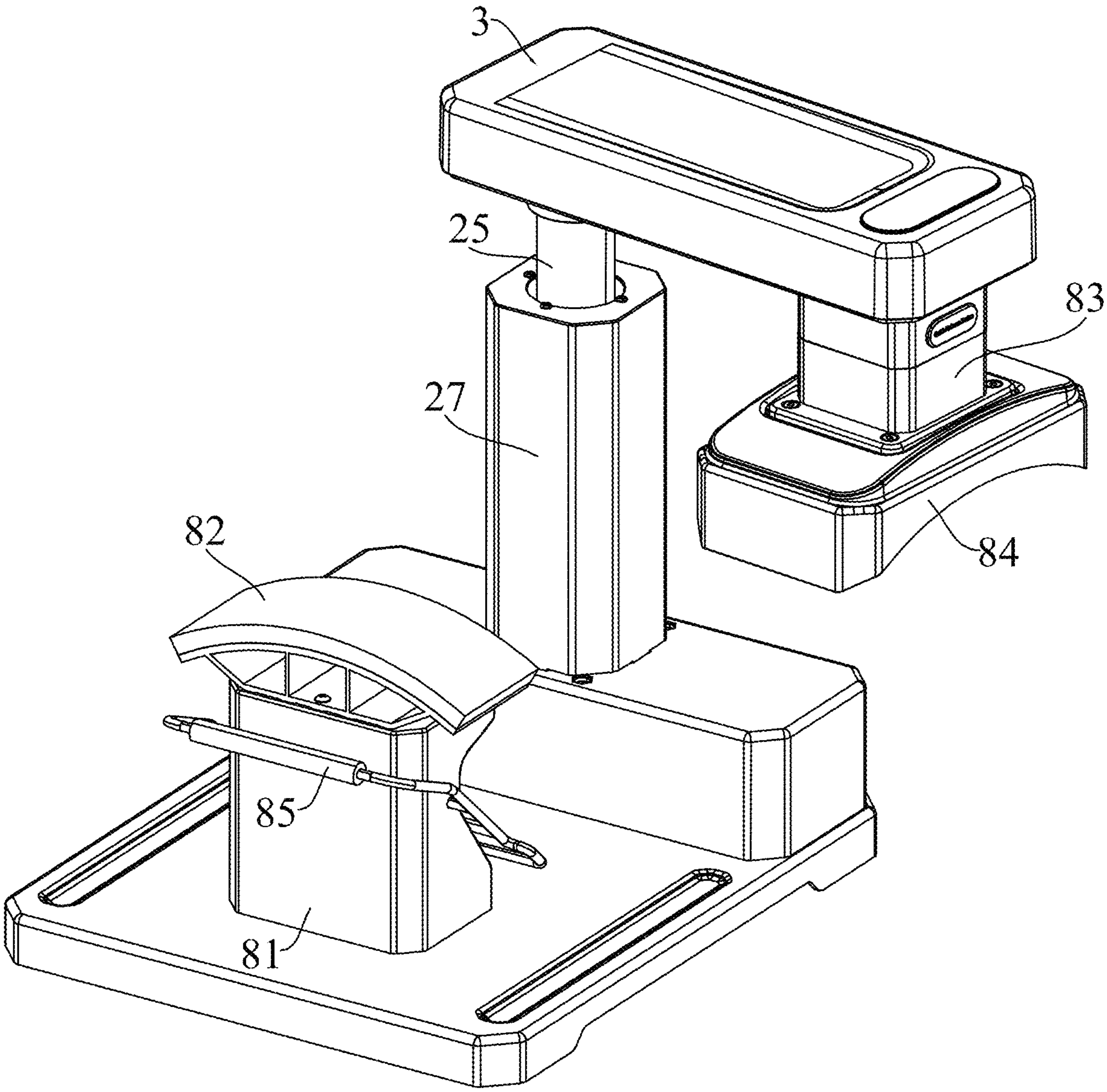
FIG. 16 is an overall structural diagram showing that a heat press mechanism for hats is selected as a functional mechanism and an upper heating disc is lifted and rotated according to an example of the present application.

In the example, when heat press for hats is needed, firstly, with reference to FIG. 16, it is necessary to lift and rotate the supporting main beam 3 towards one side by controlling the lifting and rotating mechanism 2. In this case, the upper heating disc 84 is arranged above the material placing plate 82 in a staggered manner, such that it is convenient for the user to place the hats on the material placing plate 82, and fixing of the hats is completed by means of the hat fixing assembly 85. After it is confirmed that the hats are placed in place, the supporting main beam 3 is controlled to descend by means of the lifting and rotating mechanism 2 and rotate to an original position until the upper heating disc 84 abuts against positions at which the hats need to be baked (in this case, the upper heating disc 84 is energized, and a temperature is increased to a suitable thermoprinting temperature). After baking is completed, the supporting main beam 3 is driven to lift by means of the lifting and rotating mechanism 2 in the same way and rotate towards one side. In this case, the hats may be removed.

Figure 7:
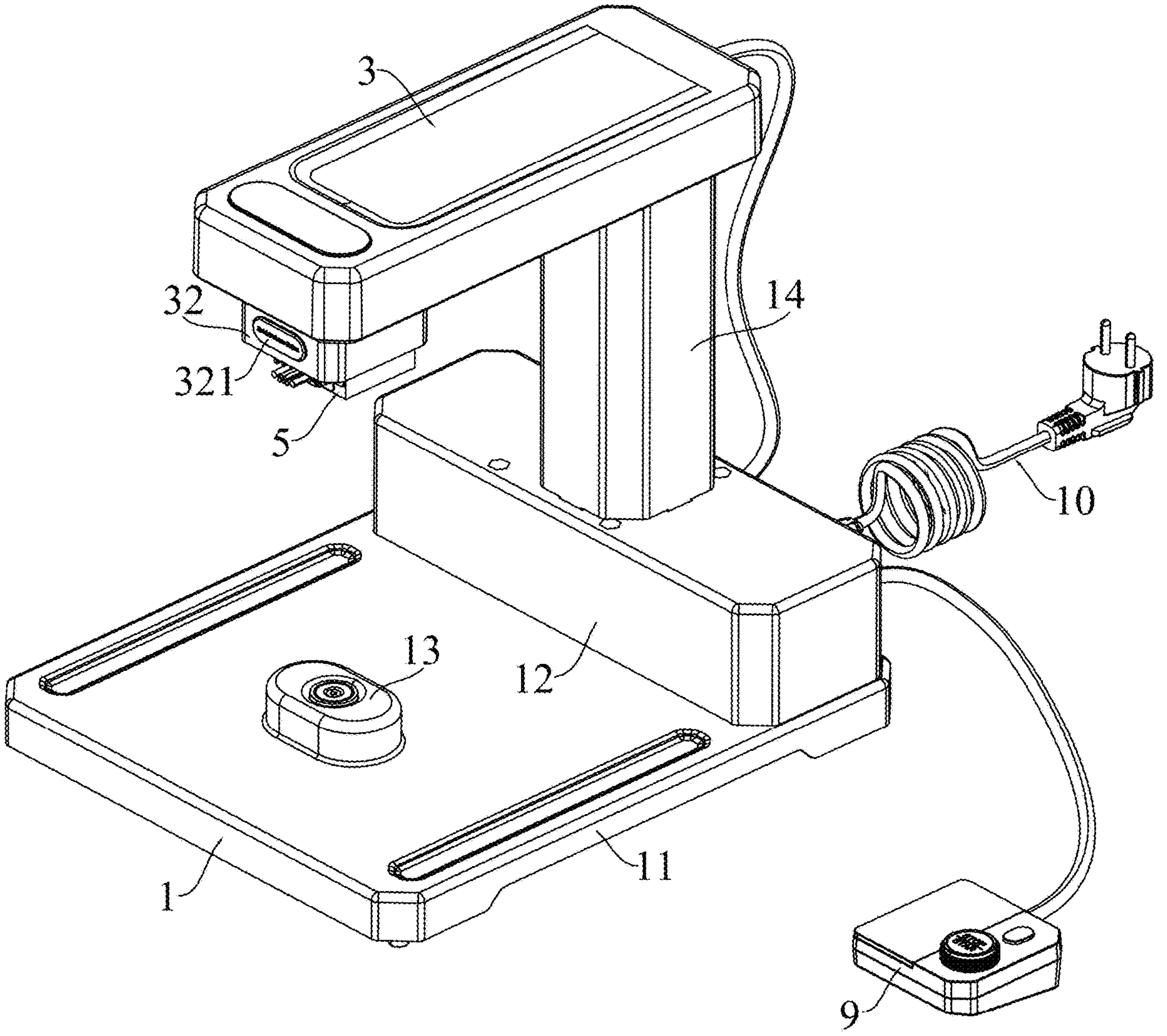
FIG. 7 is an overall structural diagram of a front side after functional mechanisms are removed according to an example of the present application.
Figure 9:
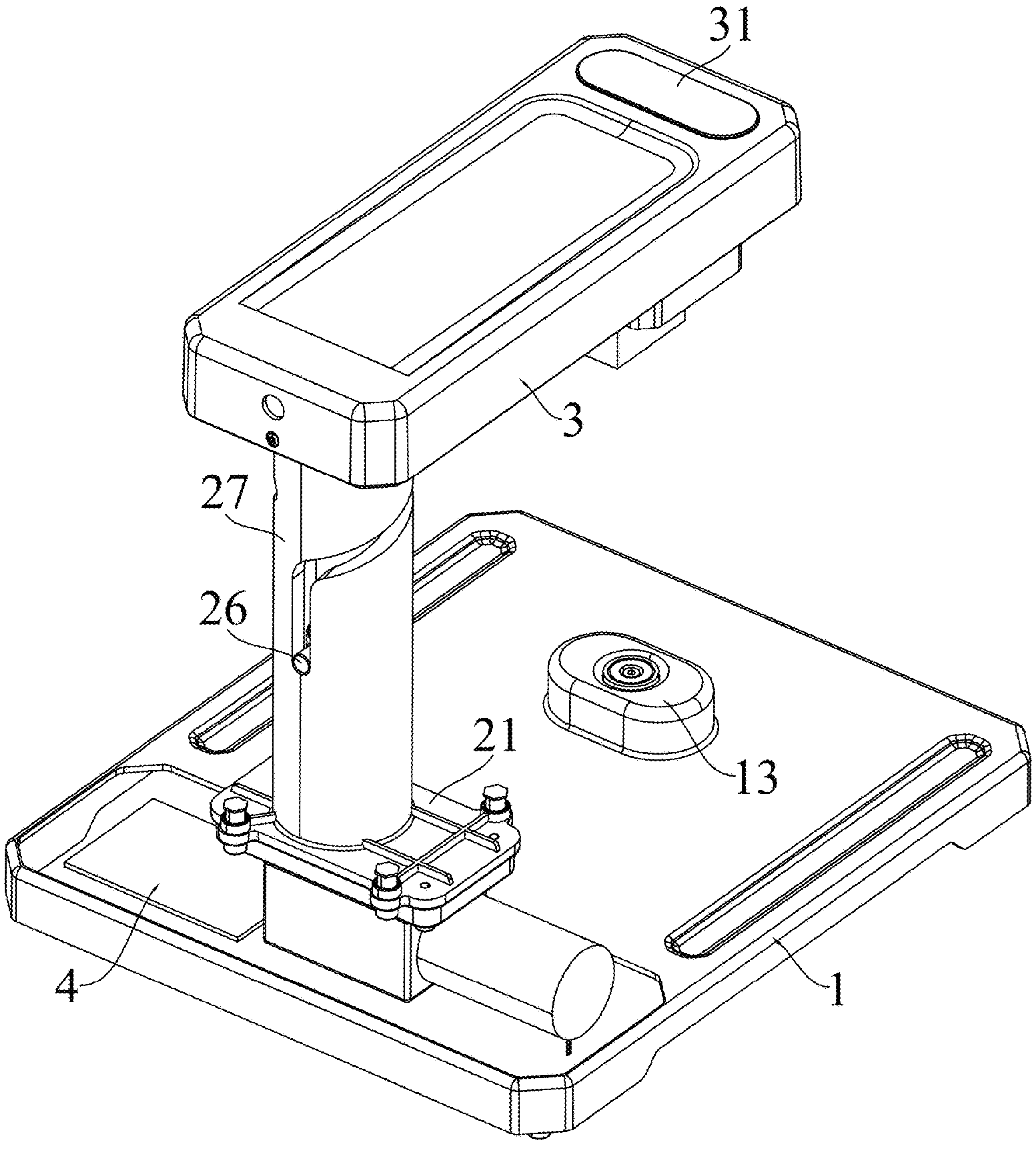
FIG. 9 is an overall structural diagram from a rear perspective after functional mechanisms are removed and an upper housing is hidden according to an example of the present application.

With reference to FIGS. 7 and 9, it can be seen that in the example, a lower housing 12 is arranged above the bottom plate 11, the mounting plate 21 is fixed on the lower housing 12, the integrated circuit board 4 and the driving motor 22 are mounted inside the lower housing 12, an upper housing 14 is fixed above the lower housing 12, the fixing sleeve 27 is fixed in the upper housing 14, and an upper end of the lifting sleeve rod 25 extends above the upper housing 14.

Then, in the example, the motor fixing plate 211 is fixed below the mounting plate 21, the driving motor 22 is fixedly mounted on the motor fixing plate 211, and the integrated circuit board 4 is fixed on the bottom plate 11. Moreover, the lower housing 12 and the upper housing 14 are designed to protect and shield the integrated circuit board 4, the lifting and rotating mechanism 2, and an internal circuit on one hand, and to make overall appearance more attractive on the other hand.

Figure 6:
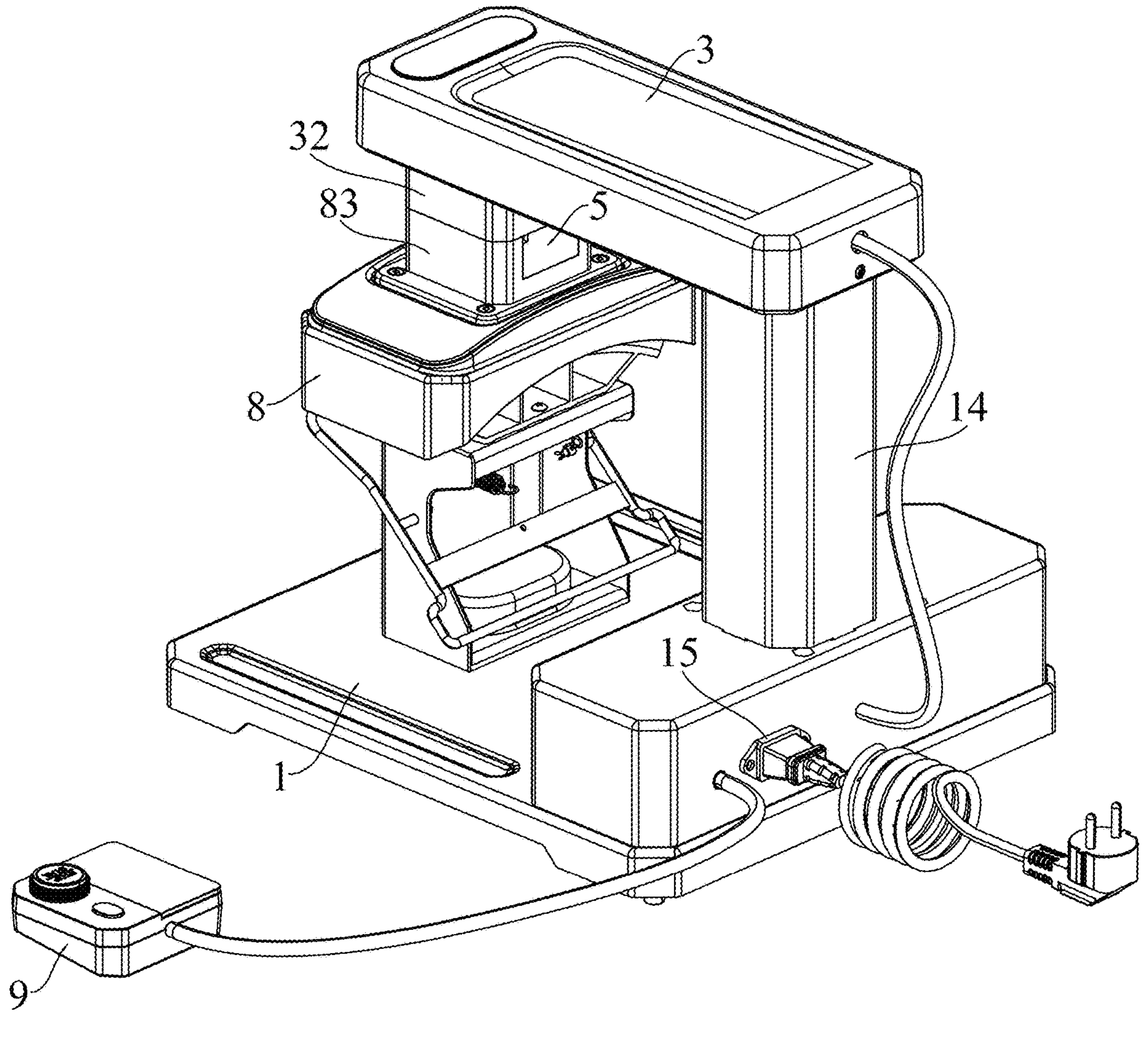
FIG. 6 is an overall structural diagram from a rear perspective showing that a heat press mechanism for hats is selected as a functional mechanism according to an example of the present application.

Moreover, with reference to FIG. 6, it can be seen that in the example, an electrical jack 15 is provided at a rear end of the lower housing 12, and the electrical jack 15 is used for externally connecting a power cord 10.

In the example, the controller 9 is located outside the rack 1, the controller 9 is connected to the integrated circuit board 4 by means of an electrical wire, and a switch button 91 and a function switching button are arranged on the controller 9.

Herein, the controller 9 is arranged outside the rack 1 such that a user can conveniently control the integrated circuit board 4 to work, and the user can control the lifting and rotating mechanism 2 to work by means of the switch button 91.

More specifically, an upper end of the supporting main beam 3 is provided with a display panel 31, and the display panel 31 is electrically connected to the integrated circuit board 4.

What are described above of the liftable and rotatable multifunctional thermal transfer printer of the present disclosure are merely preferred examples of the present disclosure and do not limit the patent scope of the present disclosure, and equivalent structural transformations made according to contents of the description and the accompanying drawings of the present disclosure under the inventive concept of the present disclosure and used directly or indirectly in other related technical fields shall all fall within the scope of protection of the patent of the present disclosure.

What is claimed is:

1. A liftable and rotatable multifunctional thermal transfer printer, comprising:

a rack;

a lifting and rotating mechanism mounted on the rack and comprising a mounting plate fixed on the rack, and a driving motor and a fixing sleeve fixed on the mounting plate, wherein the driving motor is used for driving a screw rod arranged in a vertical direction to rotate, a nut seat is mounted on the screw rod, a lifting sleeve rod is fixed on the nut seat, at least one guide column is fixed outside the lifting sleeve rod, the fixing sleeve sleeves the lifting sleeve rod, at least one guide channel is arranged on the fixing sleeve in an extending direction of the fixing sleeve, the guide channel sequentially comprises a first guide groove and a second guide groove which are in communication with each other from bottom to top, the first guide groove extends in a vertical straight line, the second guide groove is spirally coiled and extends upwards in a circumferential direction of the fixing sleeve, and the guide column is cooperatively placed in the guide channel;

a supporting main beam fixedly mounted above the lifting sleeve rod;

several functional mechanisms at least comprising a heat press mechanism for fabric, a heat press mechanism for cups, and a heat press mechanism for hats, wherein one of the functional mechanisms is detachably mounted below the supporting main beam;

a controller mounted on the rack or outside the rack; and an integrated circuit board mounted on the rack, wherein the driving motor, the functional mechanisms and the controller are electrically connected to the integrated circuit board.

2. The liftable and rotatable multifunctional thermal transfer printer according to claim 1, wherein two guide columns are arranged and are arranged on opposite sides of the lifting sleeve rod respectively, and two guide channels are arranged and arranged on opposite sides of the fixing sleeve rod respectively.

3. The liftable and rotatable multifunctional thermal transfer printer according to claim 1, wherein a power supply socket is arranged below one end of the supporting main beam away from the lifting sleeve rod, and slots for allowing the power supply socket to be cooperatively inserted are provided at upper ends of the functional mechanisms.

4. The liftable and rotatable multifunctional thermal transfer printer according to claim 3, wherein a connecting seat is fixed on the supporting main beam, the power supply socket is fixedly mounted below the connecting seat, connectors are arranged at upper ends of the functional mechanisms, the slots are provided on the connectors, and a quick-release structure is arranged between the connecting seat and the connectors.

5. The liftable and rotatable multifunctional thermal transfer printer according to claim 4, wherein the quick-release structure comprises a quick-release button arranged on the connecting seat, a clamping head is arranged on the connecting seat, clamping openings are provided on upper end surfaces of the connectors, and the quick-release button is used for driving the clamping head to be clamped to or separated from the clamping openings.

6. The liftable and rotatable multifunctional thermal transfer printer according to claim 1, wherein the rack comprises a bottom plate, a positioning block is arranged on the bottom plate, and lower ends of the functional mechanisms are provided with positioning grooves for allowing the positioning block to be placed.

7. The liftable and rotatable multifunctional thermal transfer printer according to 6, wherein a lower housing is arranged above the bottom plate, the mounting plate is fixed on the lower housing, the integrated circuit board and the driving motor are mounted inside the lower housing, an upper housing is fixed above the lower housing, the fixing sleeve is fixed in the upper housing, and an upper end of the lifting sleeve rod extends above the upper housing.

8. The liftable and rotatable multifunctional thermal transfer printer according to claim 7, wherein an electrical jack is provided at a rear end of the lower housing, and the electrical jack is used for externally connecting a power cord.

9. The liftable and rotatable multifunctional thermal transfer printer according to claim 1, wherein the controller is located outside the rack, the controller is connected to the integrated circuit board by means of an electrical wire, and a switch button and a function switching button are arranged on the controller.

10. The liftable and rotatable multifunctional thermal transfer printer according to claim 1, wherein an upper end of the supporting main beam is provided with a display panel, and the display panel is electrically connected to the integrated circuit board.

* * * * *